US008846553B2

(12) United States Patent
Goering

(10) Patent No.: US 8,846,553 B2
(45) Date of Patent: Sep. 30, 2014

(54) WOVEN PREFORM WITH INTEGRAL OFF AXIS STIFFENERS

(75) Inventor: Jonathan Goering, York, ME (US)

(73) Assignee: Albany Engineered Composites, Inc., Rochester, NH (US)

(*) Notice: Subject to any disclaimer, the term of this patent is extended or adjusted under 35 U.S.C. 154(b) by 860 days.

(21) Appl. No.: 12/346,576

(22) Filed: Dec. 30, 2008

(65) Prior Publication Data

US 2010/0167007 A1 Jul. 1, 2010

(51) Int. Cl.
| | |
|---|---|
| *B32B 27/38* | (2006.01) |
| *B32B 5/26* | (2006.01) |
| *B32B 27/04* | (2006.01) |
| *B32B 3/04* | (2006.01) |
| *B29B 11/16* | (2006.01) |
| *B29C 70/22* | (2006.01) |
| *B29C 70/54* | (2006.01) |
| *D03D 11/02* | (2006.01) |
| *B29K 105/08* | (2006.01) |

(52) U.S. Cl.
CPC .............. *B29C 70/222* (2013.01); *B29B 11/16* (2013.01); *D10B 2505/02* (2013.01); *B29K 2105/0845* (2013.01); *B29C 70/545* (2013.01); *D03D 11/02* (2013.01)
USPC ........... 442/253; 442/246; 442/251; 442/255; 428/124; 428/130

(58) Field of Classification Search
USPC ................ 442/203–220, 246, 251, 253, 255; 428/176–177, 179, 181–186, 124, 130
See application file for complete search history.

(56) References Cited

U.S. PATENT DOCUMENTS

| | | | | |
|---|---|---|---|---|
| 3,234,972 | A | * | 2/1966 | Koppelman et al. ...... 139/384 R |
| 4,256,790 | A | | 3/1981 | Lackman et al. |
| 4,331,349 | A | | 5/1982 | Funahashi |
| 4,331,495 | A | | 5/1982 | Lackman et al. |
| 4,379,798 | A | * | 4/1983 | Palmer et al. .................. 442/205 |

(Continued)

FOREIGN PATENT DOCUMENTS

| | | |
|---|---|---|
| WO | WO 02/016197 A | 2/2002 |
| WO | WO 02/066235 A | 8/2002 |
| WO | WO 2007/061586 A | 5/2007 |

OTHER PUBLICATIONS

Shukla, J.G. and Bayha, T.D., "Advanced Resin Systems and 3-D Textile Preforms for Low Cost Composite Structures," Third NASA Advanced Composite Technology Conference, vol. 1, pp. 159-173, Jun. 1992.*

(Continued)

*Primary Examiner* — Jeremy R Pierce
(74) *Attorney, Agent, or Firm* — Frommer Lawrence & Haug LLP; Ronald R. Santucci

(57) ABSTRACT

An integrally woven three-dimensional preform with stiffeners in two or more directions constructed from a woven fabric having a first, second and optional third woven fabric layer. A plurality of yarns are interwoven over a region between the first and second fabric layers such that the first fabric layer is foldable relative to the second fabric layer. An additional plurality of yarns are interwoven over a region between the second and third fabric layers such that the third fabric layer is foldable relative to the second fabric layer. Upon folding of the woven fabric layers, the integrally woven three-dimensional preform with stiffeners in two or more directions is formed.

34 Claims, 22 Drawing Sheets

(56) References Cited

U.S. PATENT DOCUMENTS

| | | | |
|---|---|---|---|
| 4,922,968 A | 5/1990 | Bottger et al. | |
| 5,085,252 A | 2/1992 | Mohamed et al. | |
| 5,429,853 A | 7/1995 | Darrieux | |
| 5,772,821 A | 6/1998 | Yasui et al. | |
| 5,783,279 A | 7/1998 | Edgson et al. | |
| 5,785,094 A | 7/1998 | Yoshida | |
| 5,804,277 A * | 9/1998 | Ashbee | 442/205 |
| 5,899,241 A | 5/1999 | David et al. | |
| 6,010,652 A | 1/2000 | Yoshida | |
| 6,019,138 A | 2/2000 | Malek et al. | |
| 6,103,337 A | 8/2000 | Burgess | |
| 6,283,168 B1 | 9/2001 | Gu et al. | |
| 6,374,570 B1 | 4/2002 | McKague, Jr. | |
| 6,418,973 B1 | 7/2002 | Cox et al. | |
| 6,446,675 B1 | 9/2002 | Goering | |
| 6,520,706 B1 | 2/2003 | McKague, Jr. et al. | |
| 6,589,472 B1 | 7/2003 | Benson et al. | |
| 6,676,882 B2 | 1/2004 | Benson et al. | |
| 6,712,099 B2 | 3/2004 | Schmidt et al. | |
| 6,718,713 B2 | 4/2004 | McKague, Jr. et al. | |
| 6,733,211 B1 | 5/2004 | Durie | |
| 6,733,862 B2 | 5/2004 | Goering | |
| 6,821,368 B2 | 11/2004 | Benson et al. | |
| 6,835,261 B2 | 12/2004 | Schmidt | |
| 6,874,543 B2 | 4/2005 | Schmidt et al. | |
| 6,913,045 B2 | 7/2005 | Fantino et al. | |
| 7,014,805 B1 | 3/2006 | Reis et al. | |
| 7,077,167 B2 | 7/2006 | Nayfeh et al. | |
| 7,198,692 B2 | 4/2007 | Bersuch et al. | |
| 7,244,487 B2 | 7/2007 | Brantley et al. | |
| 7,713,893 B2 * | 5/2010 | Goering | 442/246 |
| 2002/0056484 A1 * | 5/2002 | Uchida et al. | 139/383 R |
| 2002/0081926 A1 | 6/2002 | Goering et al. | |
| 2002/0090874 A1 | 7/2002 | McKague, Jr. et al. | |
| 2003/0041948 A1 | 3/2003 | Bersuch et al. | |
| 2003/0056847 A1 | 3/2003 | Schmidt et al. | |
| 2003/0116267 A1 | 6/2003 | Sheahen et al. | |
| 2004/0023581 A1 | 2/2004 | Bersuch et al. | |
| 2006/0121809 A1 * | 6/2006 | Goering | 442/246 |
| 2007/0120288 A1 | 5/2007 | Ashton et al. | |
| 2009/0163100 A1 * | 6/2009 | Goering | 442/205 |

OTHER PUBLICATIONS

International Search Report and Written Opinion from European PatentOffice for corresponding international application PCT/US2009/069235 dated Jul. 12, 2011.

\* cited by examiner

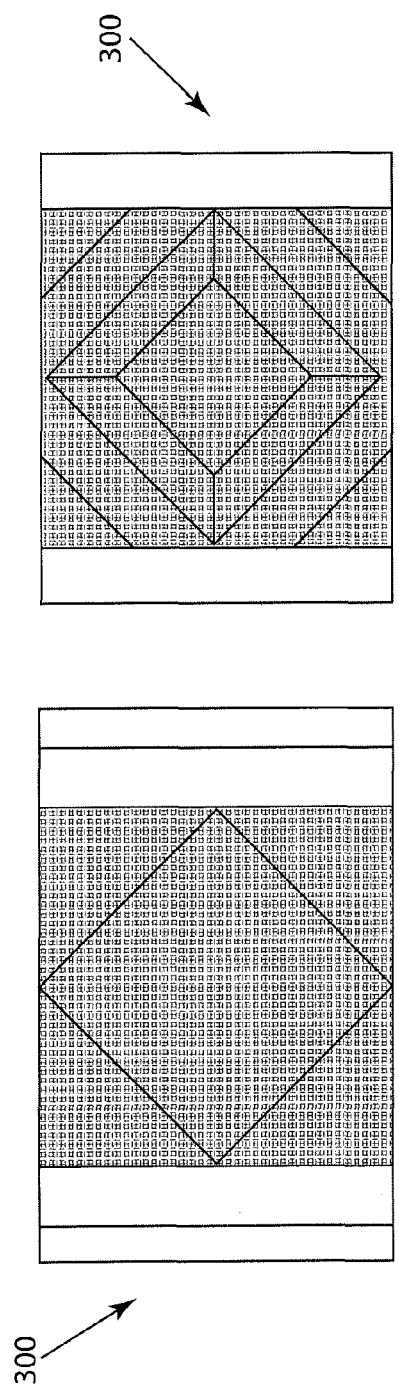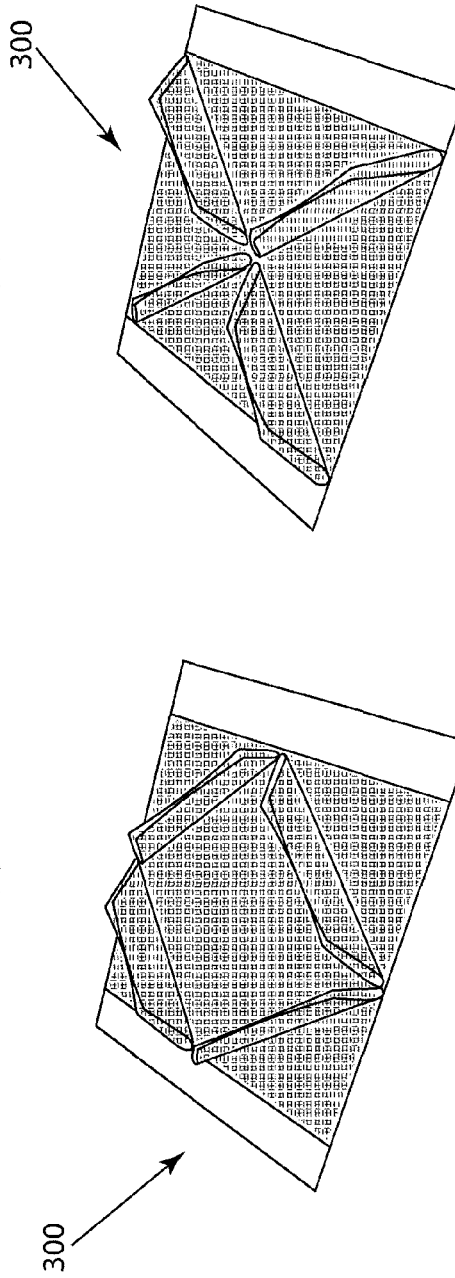
FIG. 21(a) FIG. 21(b) FIG. 21(c) FIG. 21(d)

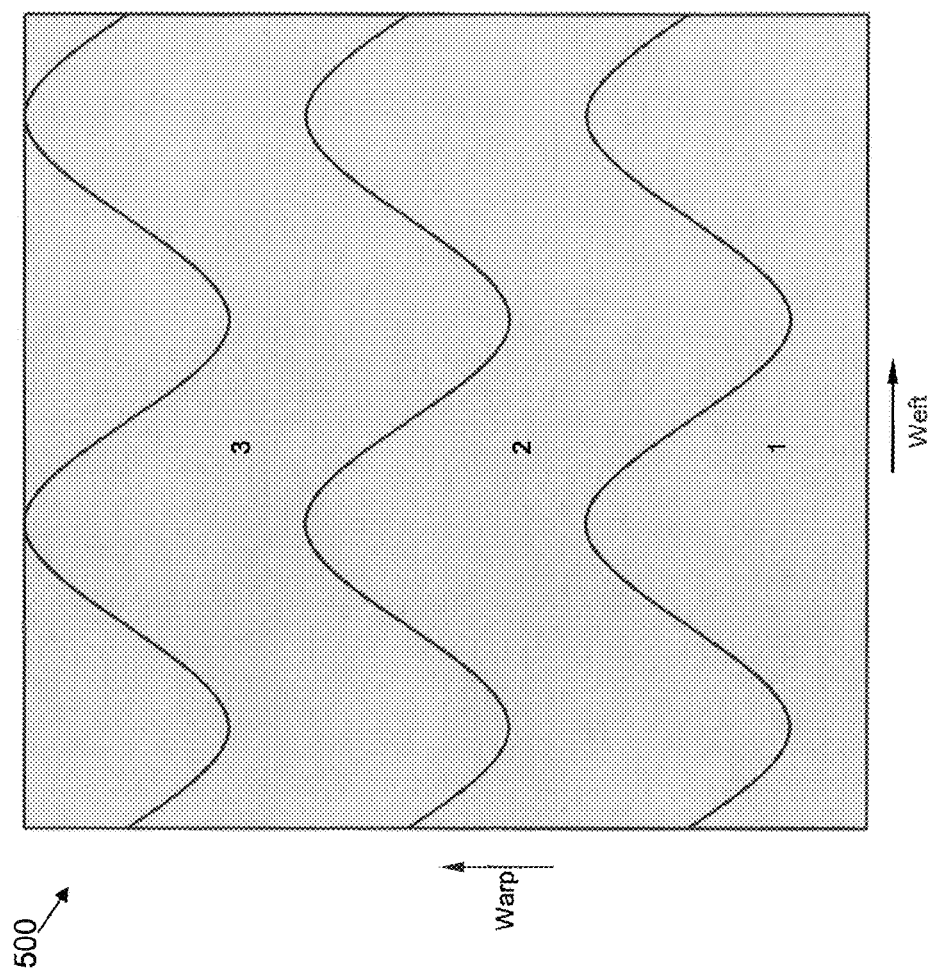

WOVEN PREFORM WITH INTEGRAL OFF AXIS STIFFENERS

CROSS-REFERENCE TO RELATED APPLICATION

This application might be considered to be related to U.S. patent application Ser. No. 11/007,600 filed Dec. 8, 2004, and U.S. patent application Ser. No. 12/260,689 filed Oct. 29, 2008, the entire disclosures of which are hereby incorporated by reference.

BACKGROUND OF THE INVENTION

Field of the Invention

This invention generally relates to woven preforms and particularly relates to woven preforms used in reinforced composite materials, which can be woven flat and folded into their final shape, the final shape having reinforcement in two or more directions.

Incorporation by Reference

All patents, patent applications, documents, references, manufacturer's instructions, descriptions, product specifications, and product sheets for any products mentioned herein are incorporated herein by reference, and may be employed in the practice of the invention.

Description of the Prior Art

The use of reinforced composite materials to produce structural components is now widespread, particularly in applications where their desirable characteristics are sought of being light in weight, strong, tough, thermally resistant, self-supporting and adaptable to being formed and shaped. Such components are used, for example, in aeronautical, aerospace, satellite, recreational (as in racing boats and autos), and other applications.

Typically such components consist of reinforcement materials embedded in matrix materials. The reinforcement component may be made from materials such as glass, carbon, ceramic, aramid, polyethylene, and/or other materials which exhibit desired physical, thermal, chemical and/or other properties, chief among which is great strength against stress failure. Through the use of such reinforcement materials, which ultimately become a constituent element of the completed component, the desired characteristics of the reinforcement materials, such as very high strength, are imparted to the completed composite component. The constituent reinforcement materials typically, may be woven, knitted or otherwise oriented into desired configurations and shapes for reinforcement preforms. Usually particular attention is paid to ensure the optimum utilization of the properties for which the constituent reinforcing materials have been selected. Usually such reinforcement preforms are combined with matrix material to form desired finished components or to produce working stock for the ultimate production of finished components.

After the desired reinforcement preform has been constructed, matrix material may be introduced to and into the preform, so that typically the reinforcement preform becomes encased in the matrix material and matrix material fills the interstitial areas between the constituent elements of the reinforcement preform. The matrix material may be any of a wide variety of materials, such as epoxy, polyester, bismaleimide, vinyl-ester, ceramic, carbon and/or other materials, which also exhibit desired physical, thermal, chemical, and/or other properties. The materials chosen for use as the matrix may or may not be the same as that of the reinforcement preform and may or may not have comparable physical, chemical, thermal or other properties. Typically, however, they will not be of the same materials or have comparable physical, chemical, thermal or other properties, since a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known methods, and then subjected to other operations toward producing the desired component. It is significant to note at this point that after being so cured, the then solidified masses of the matrix material normally are very strongly adhered to the reinforcing material (e.g., the reinforcement preform). As a result, stress on the finished component, particularly via its matrix material acting as an adhesive between fibers, may be effectively transferred to and borne by the constituent material of the reinforcement preform.

Frequently, it is desired to produce components in configurations that are other than such simple geometric shapes as (per se) plates, sheets, rectangular or square solids, etc. A way to do this is to combine such basic geometric shapes into the desired more complex forms. One such typical combination is made by joining reinforcement preforms made as described above at an angle (typically a right-angle) with respect to each, other. Usual purposes for such angular arrangements of joined reinforcement preforms are to create a desired shape to form a reinforcement preform that includes one or more end walls or "T" intersections for example, or to strengthen the resulting combination of reinforcement preforms and the composite structure which it produces against deflection or failure upon it being exposed to exterior forces, such as pressure or tension. In any case, a related consideration is to make each juncture between the constituent components as strong as possible. Given the desired very high strength of the reinforcement preform constituents per se, weakness of the juncture becomes, effectively, a "weak link" in a structural "chain".

An example of an intersecting configuration is set forth in U.S. Pat. No. 6,103,337, the disclosure of which is incorporated herein by reference. This reference sets forth an effective means of joining together two reinforcing plates into a T-form.

Various other proposals have been made in the past for making such junctures. It has been proposed to form and cure a panel element and an angled stiffening element separate from each other, with the latter having a single panel contact surface or being bifurcated at one end to form two divergent, co-planar panel contact surfaces. The two components are then joined by adhesively bonding the panel contact surface(s) of the stiffening element to a contact surface of the other component using thermosetting adhesive or other adhesive material. However, when tension is applied to the cured panel or the skin of the composite structure, loads at unacceptably low values resulted in "peel" forces which separate the stiffening element from the panel at their interface since the effective strength of the joint is that of the matrix material and not of the adhesive.

The use of metal bolts or rivets at the interface of such components is unacceptable because such additions at least partially destroy and weaken the integrity of composite structures themselves, add weight, and introduce differences in the coefficient of thermal expansion as between such elements and the surrounding material.

Other approaches to solving this problem have been based on the concept of introducing high strength fibers across the joint area through the use of such methods as stitching one of the components to the other and relying upon the stitching thread to introduce such strengthening fibers into and across the juncture site. One such approach is shown in U.S. Pat. No. 4,331,495 and its divisional counterpart, U.S. Pat. No. 4,256,790. These patents disclose junctures having been made between a first and second composite panel made from adhesively bonded fiber plies. The first panel is bifurcated at one end to form two divergent, co-planar panel contact surfaces in the prior art manner, that have been joined to the second panel by stitches of uncured flexible composite thread through both panels. The panels and thread have then been "co-cured," i.e., cured simultaneously. Another method to improve upon junction strength is set forth in U.S. Pat. No. 5,429,853. However, this method is similar to previously described methods because separately constructed distinct elements are joined together by the stitching of a third yarn or fiber between the two. Regardless of which approach is used, the resulting structure will have relatively weak joints at the interfaces between the individual pieces, and substantial touch labor will be required to cut and collate the individual plies.

While the prior art has sought to improve upon the structural integrity of the reinforced composite and has achieved success, particularly in the case of U.S. Pat. No. 6,103,337, there exists a desire to improve thereon or address the problem through an approach different from the use of adhesives or mechanical coupling. In this regard, one approach might be by creating a woven three dimensional ("3D") structure by specialized machines. However, the expense involved is considerable and rarely is it desirable to have a weaving machine directed to creating a single structure. Despite this fact, 3D preforms which can be processed into fiber reinforced composite components are desirable because they provide increased strength relative to conventional two dimensional laminated composites. These preforms are particularly useful in applications that require the composite to carry out-of-plane loads. However, the prior-art preforms discussed above have been limited in their ability to withstand high out-of-plane loads, to be woven in an automated loom process, and to provide for varying thickness of portions of the preform.

Another approach would be to weave a two dimensional ("2D") structure and fold it into 3D shape so that the panel is integrally stiffened, i.e. yarns are continuously interwoven between the planar base or panel portion and the stiffener. Act example of a 2D woven structure that is folded into 3D shape is disclosed in U.S. Pat. No. 6,874,543, the entire content of which is incorporated herein by reference. Fiber preforms with specific structural shapes, such as for example 'T', 'I', 'H' or 'Pi' cross sections, can be woven on a conventional shuttle loom, and several existing patents describe the method of weaving such structures (U.S. Pat. No. 6,446,675 and U.S. Pat. No. 6,712,099, for example). Another approach for constructing stiffened panels is set forth in U.S. Pat. No. 6,019,138, the entire content of which is incorporated herein by reference, which discloses a method for making stiffened panels with reinforcing stiffeners in both the warp and fill directions. As disclosed, this method achieves reinforcement in two directions through over weaving, or simply weaving high spots into the panel portion of the preform. In all prior art, however, the preforms have been constructed so the stiffeners have either 0 degrees or ±90 degrees orientation.

SUMMARY OF THE INVENTION

Accordingly, a need exists for an integrally woven preform that provides reinforcement in two or more directions that can be woven in one process using a conventional loom without any special modifications. Specifically, a need exists for an integrally woven preform with off-axis stiffeners where the stiffeners are oriented in a direction or angle other than 0 and ±90 degrees, or the off-axis stiffeners are formed in combination with stiffeners that are oriented in the 0 and ±90 degrees direction.

The instant invention eliminates the weak joints discussed in the prior art structures by integrally weaving the skin and stiffeners so there is continuous fiber across at least some of the interfaces.

One exemplary embodiment of the invention is an integrally woven preform with stiffeners in two or more directions constructed from a woven base fabric. The structure includes a first woven fabric layer, a second woven fabric layer, and a plurality of yarns interwoven between the first woven fabric layer and the second woven fabric layer, wherein the plurality of yarns are interwoven over a region between the first fabric layer and the second fabric layer, and the first fabric layer is folded relative to the second fabric layer such that a first off-axis stiffener is formed in the preform. The first woven fabric layer is slit from a top surface of the second woven fabric layer in one or more regions. A first portion on a first side of an interwoven region of the first woven fabric layer is folded together with a first portion on a second side of the interwoven region of the first woven fabric layer to form an off-axis stiffener rib in a first direction. The woven preform may also include a third woven fabric layer, and a plurality of yarns interwoven between the second woven fabric layer and the third woven fabric layer, wherein the plurality of yarns are interwoven over a region between the second fabric layer and the third fabric layer, and the third fabric layer is folded relative to the second fabric layer such that a second off-axis stiffener is formed in the preform. The third woven fabric layer is slit from a bottom surface of the second woven fabric layer in one or more regions. A first portion on a first side of an interwoven region of the third woven fabric layer is folded together with a first portion on a second side of the interwoven region of the third woven fabric layer to form an off-axis stiffener rib in a second direction.

Another exemplary embodiment of the invention is a fiber reinforced composite including an integrally woven preform with stiffeners in two or more directions constructed from a woven base fabric. The structure includes a first woven fabric layer, a second woven fabric layer, and a plurality of yarns interwoven between the first woven fabric layer and the second woven fabric layer, wherein the plurality of yarns are interwoven over a region between the first fabric and the second fabric, and the first fabric is folded relative to the second fabric such that a first off-axis stiffener is formed in the preform.

Yet another exemplary embodiment of the invention is an integrally woven preform with stiffeners in two or more directions constructed from a woven base fabric. The structure includes a first woven fabric layer, a second woven fabric layer, and a plurality of yarns interwoven between the first woven fabric layer and the second woven fabric layer in a plurality of independent regions, wherein the first fabric is folded relative to the second fabric such that a first stiffener is formed in a first direction in the preform, and a portion of the first stiffener is folded to form a second stiffener in a second direction in the preform, the second stiffener being an off-axis stiffener. The first woven fabric layer is slit from a top surface of the second woven fabric layer in one or more regions. The woven preform may also include a third woven fabric layer, and a plurality of yarns interwoven between the second woven fabric layer and the third woven fabric layer in a plurality of independent regions, wherein the third fabric is folded relative to the second fabric such that a third stiffener is formed in a third direction in the preform, and a portion of the third stiffener is folded to form a fourth stiffener in a fourth direction in the preform, the fourth stiffener being an off-axis stiffener. The third woven fabric layer may be slit from a bottom surface of the second woven fabric layer in one or more regions.

Yet another exemplary embodiment of the invention is a fiber reinforced composite including an integrally woven preform with stiffeners in two or more directions constructed from a woven base fabric. The structure includes a first woven fabric layer, a second woven fabric layer, and a plurality of yarns interwoven between the first woven fabric layer and the second woven fabric layer in a plurality of independent regions, wherein the first fabric is folded relative to the second fabric such that a first stiffener is formed in a first direction in the preform, and a portion of the first stiffener is folded to form a second stiffener in a second direction in the preform, the second stiffener being an off-axis stiffener.

Yet another exemplary embodiment of the invention is a method of forming an integrally woven preform including the steps of providing two or more woven fabric layers, interweaving a plurality of yarns from a first woven fabric layer with a plurality of yarns from a second woven fabric layer, the first woven fabric layer being foldable in relation to the second woven fabric layer, slitting a portion of the first woven fabric layer from a top surface of the second woven fabric layer, and folding the portion of the first fabric relative to the second woven fabric layer to form a first off-axis stiffener in the preform. The method may also include the steps of folding a first portion on a first side of an interwoven region of the first woven fabric layer together with a first portion on a second side of the interwoven region of the first woven fabric layer to form an off-axis stiffener rib in a first direction. The method may further include the steps of interweaving a plurality of yarns from a third woven fabric layer with a plurality of yarns from a second woven fabric layer, the third woven fabric layer being foldable in relation to the second woven fabric layer, slitting a portion of the third woven fabric layer from a bottom surface of the second woven fabric layer, and folding the portion of the third fabric relative to the second woven fabric layer to form a second off-axis stiffener in the preform. A first portion on a first side of an interwoven region of the third woven fabric layer may be folded together with a first portion on a second side of the interwoven region of the third woven fabric layer to form an off-axis stiffener rib in a second direction.

Yet another exemplary embodiment of the invention is a method of forming a fiber reinforced composite including the steps of forming an integrally woven preform by providing two or more woven fabric layers, interweaving a plurality of yarns from a first woven fabric layer with a plurality of yarns from a second woven fabric layer, the first woven fabric layer being foldable in relation to the second woven fabric layer, slitting a portion of the first woven fabric layer from a top surface of the second woven fabric layer, and folding the portion of the first fabric relative to the second woven fabric layer to form a first off-axis stiffener in the preform.

Yet another exemplary embodiment of the invention is a method of forming an integrally woven preform including the steps of providing two or more woven fabric layers, interweaving a plurality of yarns from a first woven fabric layer with a plurality of yarns from a second woven fabric layer in a plurality of independent regions, the first woven fabric layer being foldable in relation to the second woven fabric layer, slitting a portion of the first woven fabric layer from a top surface of the second woven fabric layer, and folding the portion of the first fabric relative to the second woven fabric layer such that a first stiffener is formed in a first direction in the preform, and a portion of the first stiffener is folded to form a second stiffener in a second direction in the preform, the second stiffener being an off-axis stiffener. The method may also include interweaving a plurality of yarns from a third woven fabric layer with a plurality of yarns from a second woven fabric layer in a plurality of independent regions, the third woven fabric layer being foldable in relation to the second woven fabric layer, slitting a portion of the third woven fabric layer from a top surface of the second woven fabric layer; and folding the portion of the third fabric relative to the second woven fabric layer such that a third stiffener is formed in a third direction in the preform, and a portion of the third stiffener is folded to form a fourth stiffener in a fourth direction in the preform, the fourth stiffener being an off-axis stiffener.

Yet another exemplary embodiment of the invention is a method of forming a fiber reinforced composite including the steps of forming an integrally woven preform by providing two or more woven fabric layers, interweaving a plurality of yarns from a first woven fabric layer with a plurality of yarns from a second woven fabric layer in a plurality of independent regions, the first woven fabric layer being foldable in relation to the second woven fabric layer, slitting a portion of the first woven fabric layer from a top surface of the second woven fabric layer, and folding the portion of the first fabric relative to the second woven fabric layer such that a first stiffener is formed in a first direction in the preform, and a portion of the first stiffener is folded to form a second stiffener in a second direction in the preform, the second stiffener being an off-axis stiffener.

While reference is made to woven preforms with off-axis stiffeners, the instant method can be used for making preforms of any shape, such as, for example, H-shaped or I-shaped woven preforms.

The instant method can be used to weave preforms with variable thickness or variable height stiffeners that may be parallel or angled to each other. The preform can be woven using any convenient pattern for the warp fiber, i.e., ply-to-ply, through thickness angle interlock, orthogonal, etc. While carbon fiber is preferred, the invention is applicable to practically any other fiber type.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred, but non-limiting, embodiments of the invention are illustrated in the accompanying drawings in which corresponding components are identified by the same reference numerals.

Terms "comprising" and "comprises" in this disclosure can mean "including" and "includes" or can have the meaning commonly given to the term "comprising" or "comprises" in US Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings:

FIGS. 21(a)-(d) are photographs of a woven preform, according to one aspect of the invention;

FIG. 23 is a schematic of a woven preform, according to one aspect of the invention.

DETAILED DESCRIPTION OF THE PREFERRED EMBODIMENTS

This disclosure describes several techniques for weaving a fiber preform that can be processed into a composite component consisting of a skin with integral stiffeners in multiple directions. The types of structures described in this disclosure may be used in aerospace structures such as wing panels, fuselage panels, and control surfaces, for example. One of the techniques according to one exemplary embodiment is particularly well suited to the case where the stiffeners form hexagons providing reinforcement in the 0°, +60°, and −60° directions, and another technique according to another exemplary embodiment is well suited to provide reinforcement in practically any direction, i.e., the stiffeners may be formed in practically any direction. The second approach will be described for two cases: 1) the case where stiffeners form hexagons (i.e. 0±/60° reinforcement), and 2) the case where the stiffeners are in the ±45° directions. This second case is also appropriate for more complicated components, such as I-beams or channels where only a portion of the structure requires off axis reinforcement; the web of an I-beam, for example.

Both approaches overcome one of the primary limitations of 3D woven skins, namely that they can only provide reinforcement in the 0° and 90° directions. This configuration is relatively weak when loaded in in-plane shear. The addition of ±45° stiffeners provides an additional load path for carrying this shear load, thereby increasing the stiffness and strength of the structure. The 0/±60° reinforced cases on the other hand provide quasi isotropic stiffening in the plane of the skin. Both of the techniques are based on exchanging the positions of pairs of warp and/or weft fibers as they weave through the fabric. In the first approach, however, fibers only exchange positions in one direction, for example.

Figure 1:
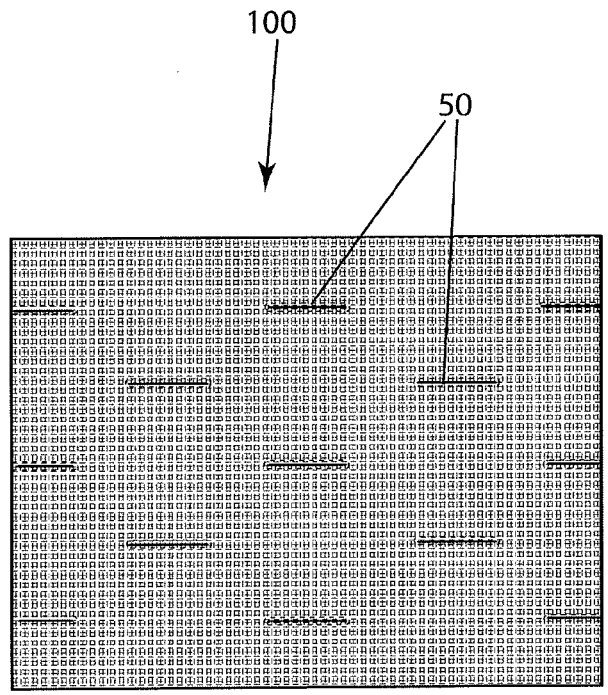
FIG. 1 is a photograph of a woven preform, according to one aspect of the invention.
Figure 2:
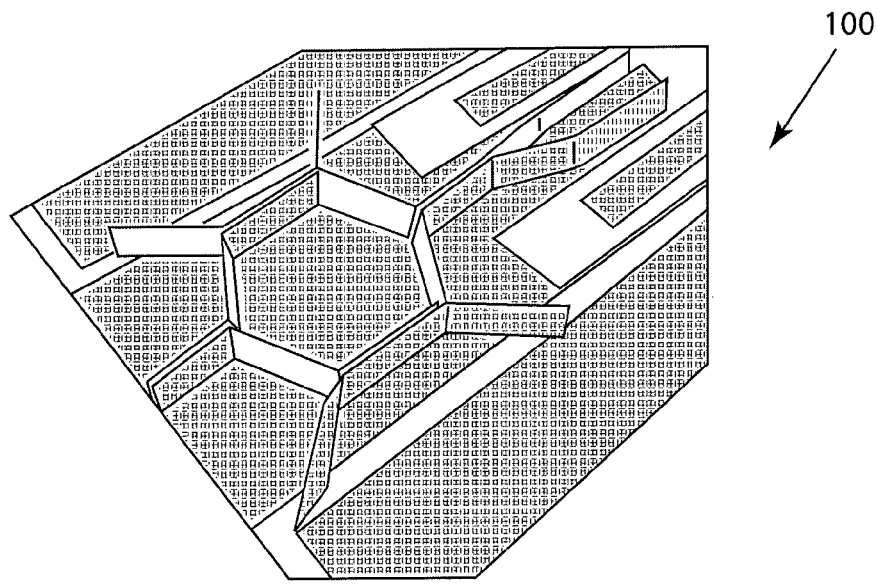
FIG. 2 is a photograph of a woven preform that is slit and folded according to one aspect of the invention.

Now turning to the figures, FIGS. 1 and 2 are photographs of an exemplary preform that is formed by utilizing the former approach. FIG. 1 shows preform 100 in its fabric stage as it comes off the loom, and FIG. 2 shows the same preform after the surface layer of the fabric has been slit and the preform 100 is folded into its final shape. The locations where weft fibers exchange positions 50 can be seen as the series of short horizontal lines in FIG. 1.

The fabric in these photographs consists of, for example, four interlocking layers and one surface layer. The surface layer may form the stiffeners and the interlocking layers may form the skin. Some of the weft fibers in the surface layer, for example, exchange positions with weft fibers in the second interlocking layer, thereby locking the surface layer to the skin. The spacing of the weft fibers can be engineered so that the stiffeners form a regular hexagon when the surface layer is slit and folded. Accordingly, the invention according to one exemplary embodiment can be a woven preform for a substrate with integral sidewalls formed in a hexagonal array.

Figure 3:
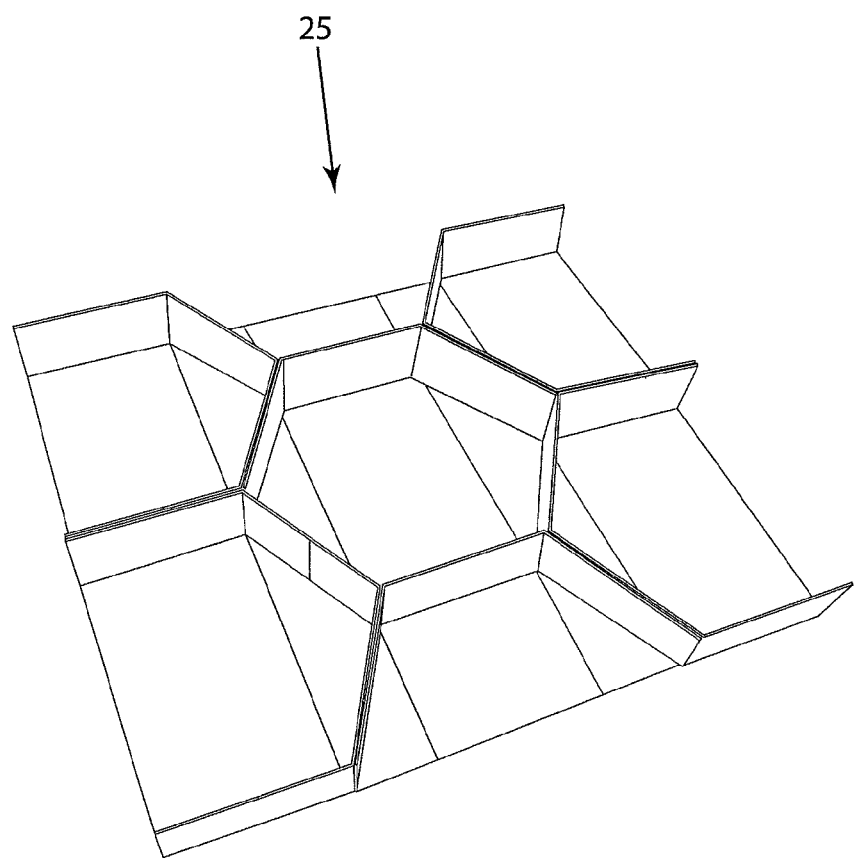
FIG. 3 is a paper mockup of the preform shown in FIG. 2.

The objective here is to weave a one piece preform consisting of a substrate with integral sidewalls that can be formed into a hexagonal array. The sidewalls consist of two layers of fabric that are folded to be perpendicular to the substrate. A paper mockup of a repeating section 25 of the preform 100 is shown in FIG. 3. It should be noted that there is continuous fiber between the substrate and sidewalls on two of the six sides of each hexagon.

Figure 4:
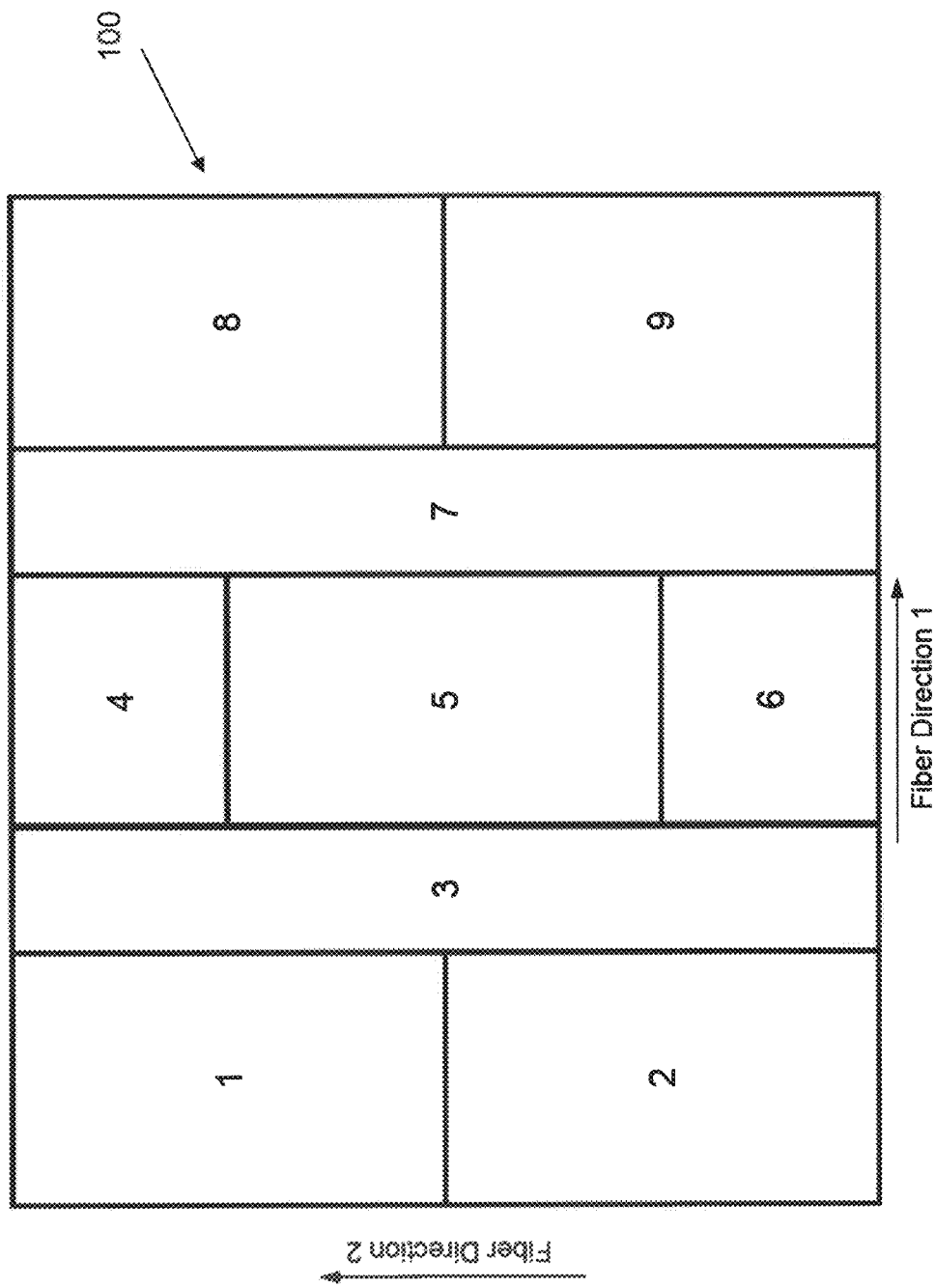
FIG. 4 is a schematic of an as-woven preform, according to one aspect of the invention.
Figure 5:
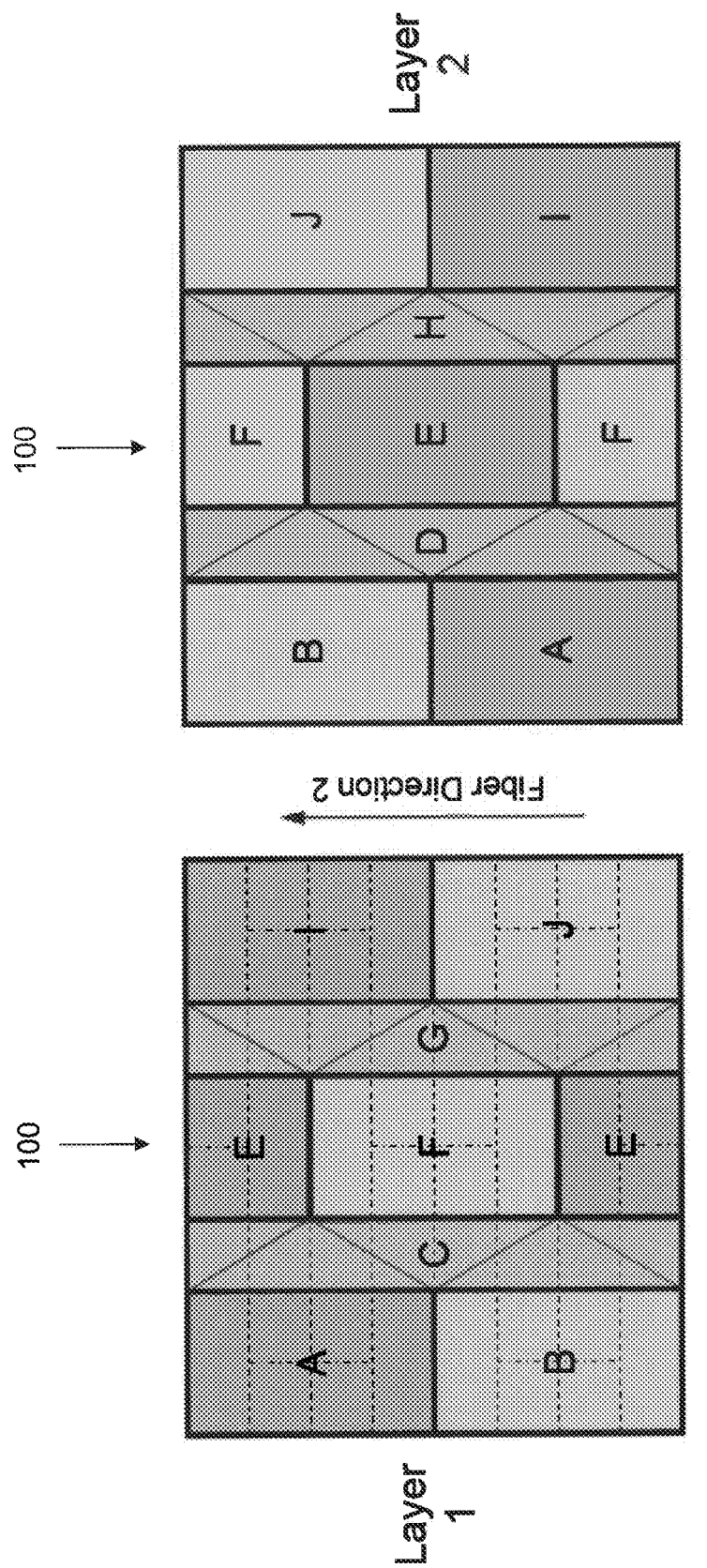
FIG. 5 is a schematic of a woven preform, according to one aspect of the invention.

The preform 100 is divided into nine regions 1-9, as shown in FIG. 4. Fiber direction 1 can be aligned with either the warp or weft, but the sidewalls that are integrally connected to the substrate will always be parallel to fiber direction 1. The preform 100 includes at least two layers, layer 1 and layer 2, for example, as shown in FIG. 5. Fibers in direction 1 always stay completely within a single layer, but fibers in direction 2 periodically switch from one layer to the next at the intersections between some regions. It is helpful to define various groups of direction 2 fibers, as shown in FIG. 5. The direction 2 fibers in Group A weave into layer 1 in region 1 and into layer 2 in region 2. Similarly, direction 2 fibers in Group B weave into layer 1 in region 2 and layer 2 in region 1. Similar relationships hold for the direction 2 fibers in groups E and F, and I and J. In contrast, direction 2 fibers in Groups C and G always weave in layer 1, and direction 2 fibers in Groups D and H always weave in layer 2.

Figure 6:
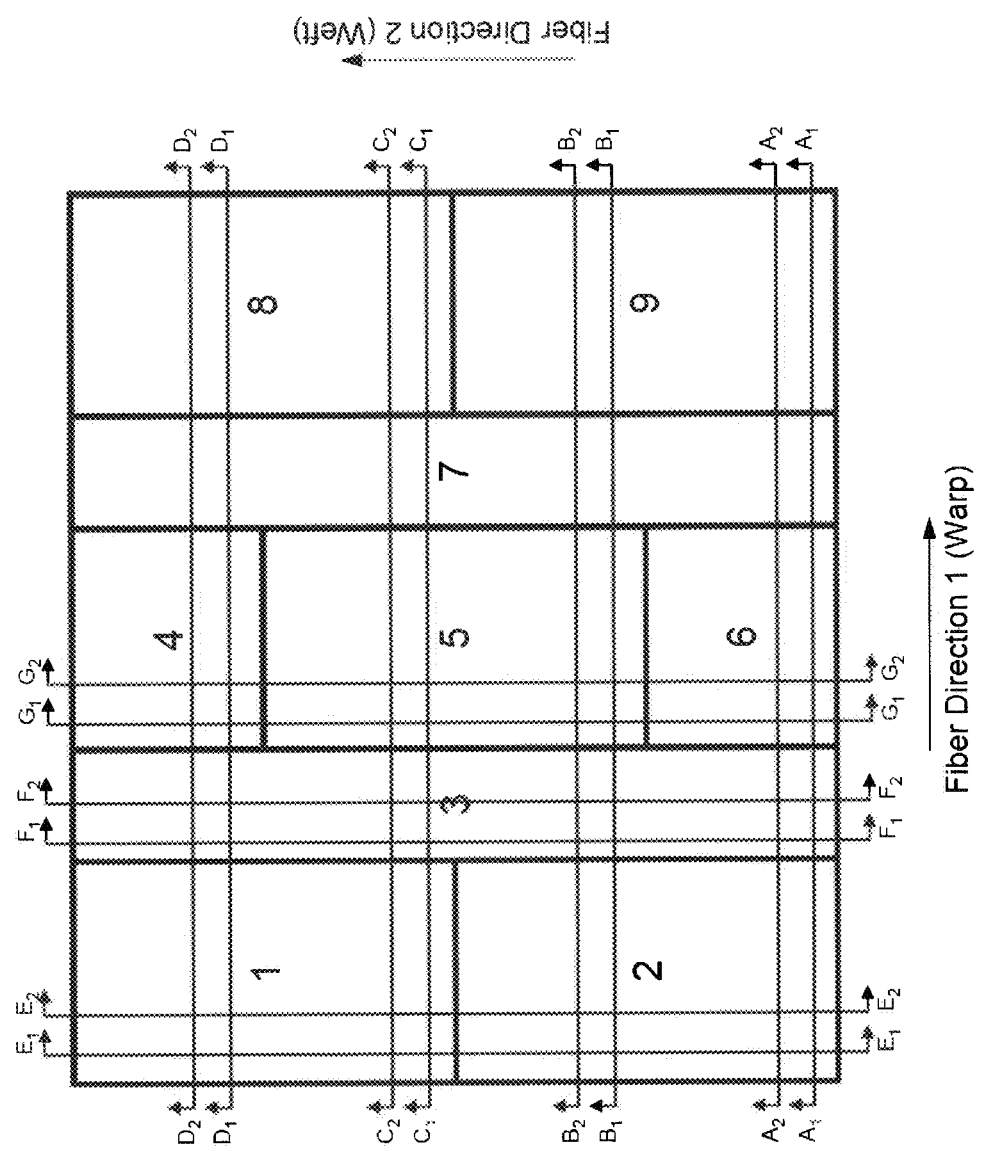
FIG. 6 is a schematic of a woven preform, according to one aspect of the invention.

An exemplary fiber architecture according to one embodiment of the present invention is shown in FIG. 6. For demonstration purposes, direction 1 refers to the warp direction and direction 2 refers to the weft direction. A series of cross sections have been drawn to clarify the positions of various fibers in each region. The in-plane position of each cross section cut is shown in FIG. 6. As it can be seen, the cross section cuts are illustrated in pairs (i.e., $A_1$-$A_1$ and $A_2$-$A_2$, for example), so that all of the warp fibers required to lock in all the weft fibers could be separated out into two groups.

Figure 7:
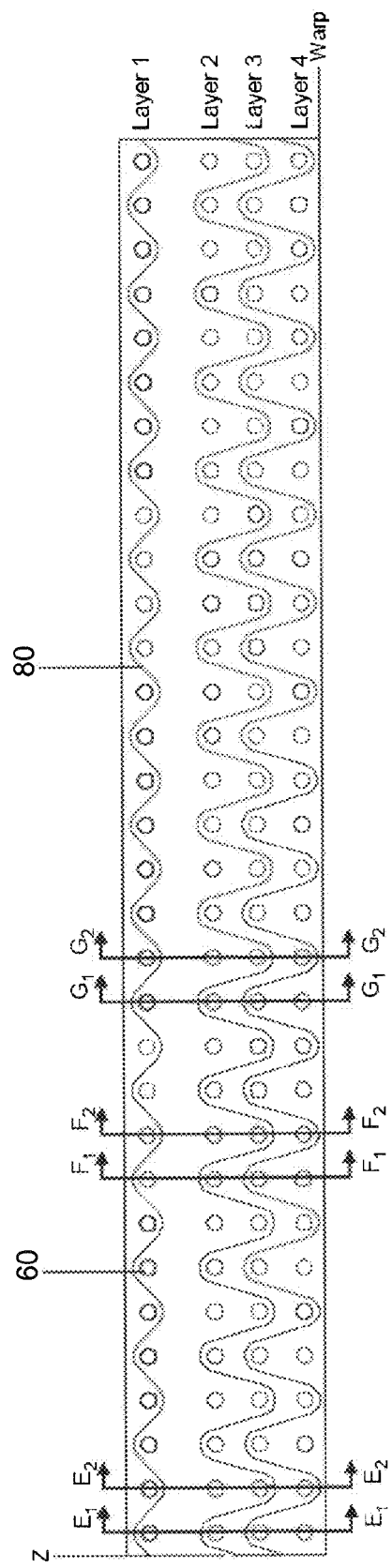
FIGS. 7-15 are cross-sectional views of a woven preform, according to one aspect of the invention.

Through thickness positions of cross section cuts in the weft direction are shown in FIG. 7, as an example. The circles represent weft fibers 60 running perpendicular to the viewer's eye and the continuous lines represent warp fibers 80. FIG. 7 also shows that there are four layers, for example, in the preform. Layer 1 consists of a single layer of fabric, which does not interchange with any other layer at this particular cross section; however, there are interchanges at other cross sections. Layers 2, 3, and 4 are actually interlocking. Layers 2 and 4 are added merely to demonstrate how the thickness of the substrate can be built up; however, they are not necessary for the practice of the invention.

Figure 8:
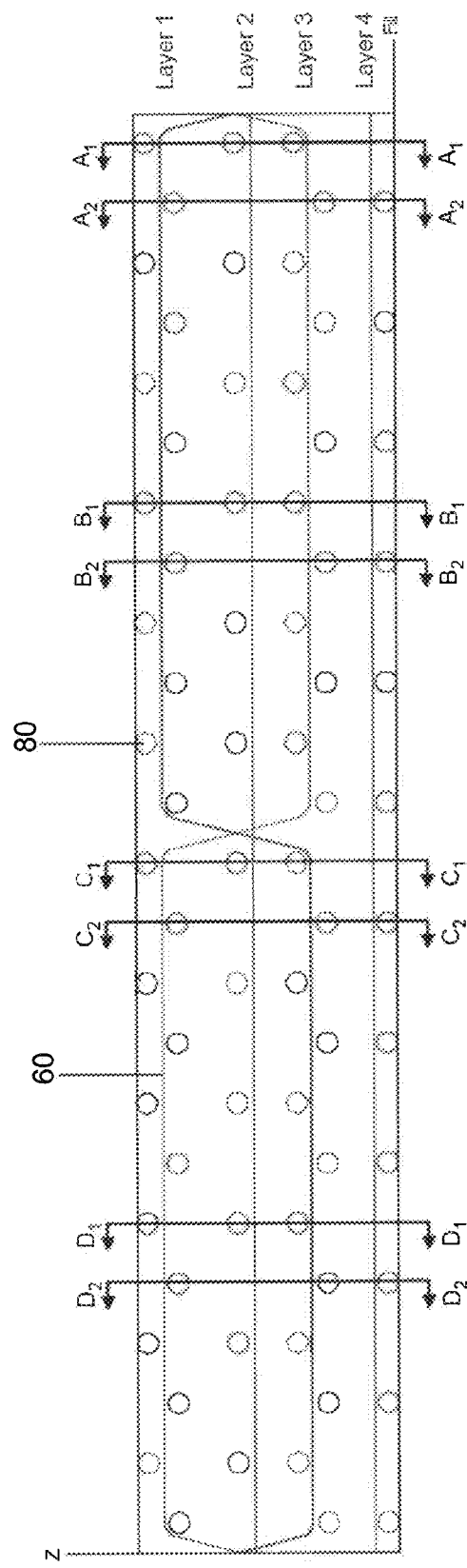
Figure 9:
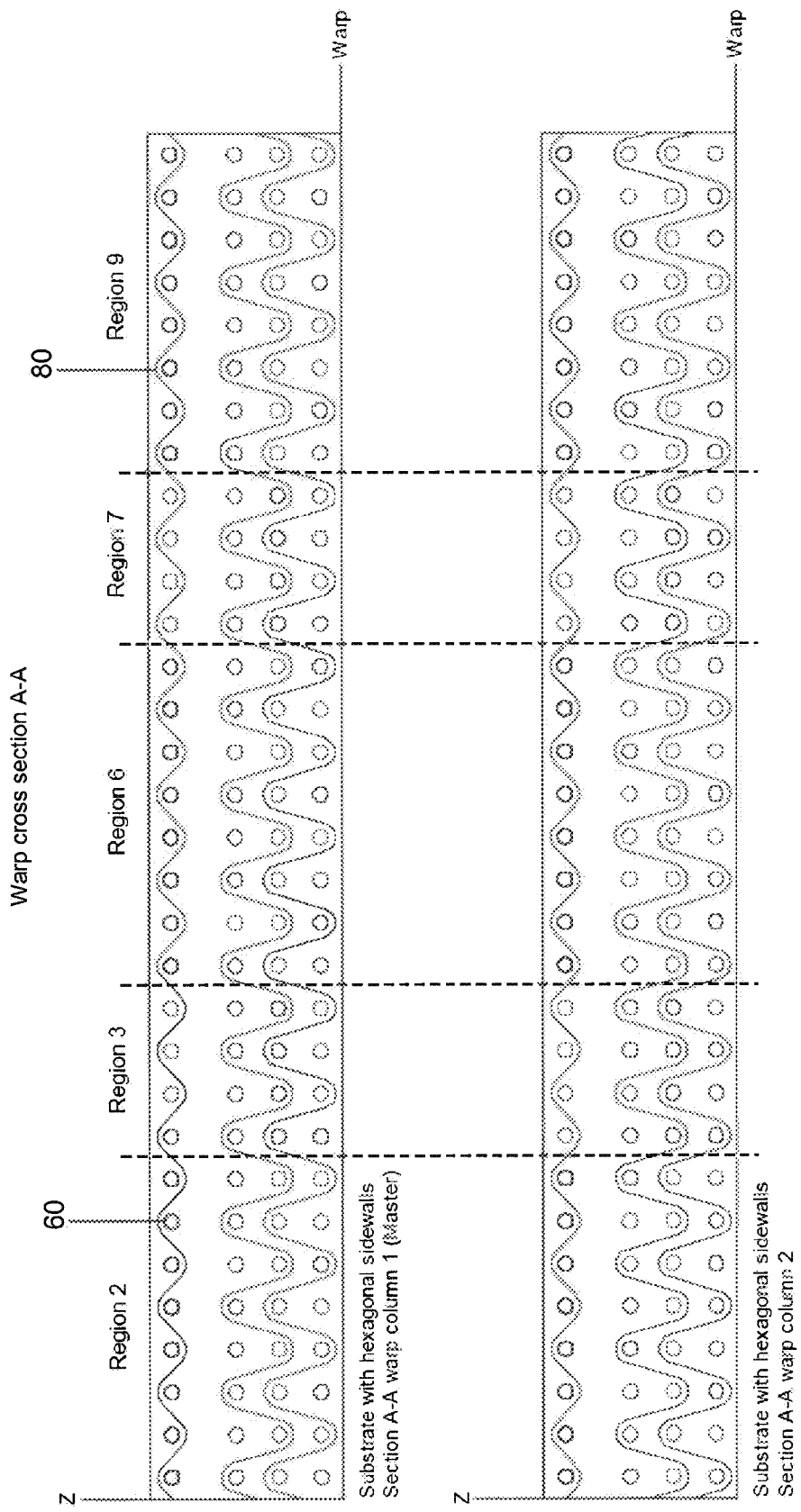

Through thickness positions of cross section cuts in the warp direction are shown in FIG. 8. In FIG. 8, circles represent warp fibers 80 running perpendicular to the viewer's eye and continuous lines represent weft fibers 60. Warp cross sections for cut A-A are shown in FIG. 9. The warp fiber 80 in layer 1 is continuous across all regions in all warp cross sections. These warp fibers become the longitudinal fibers in the sidewalls upon folding. The warp fiber 80 in layers 2, 3, and 4 are also continuous across all regions in all warp cross sections. Additional layers can be added to increase the thickness of the substrate as may be apparent to one of ordinary skill in the art.

Figure 10:
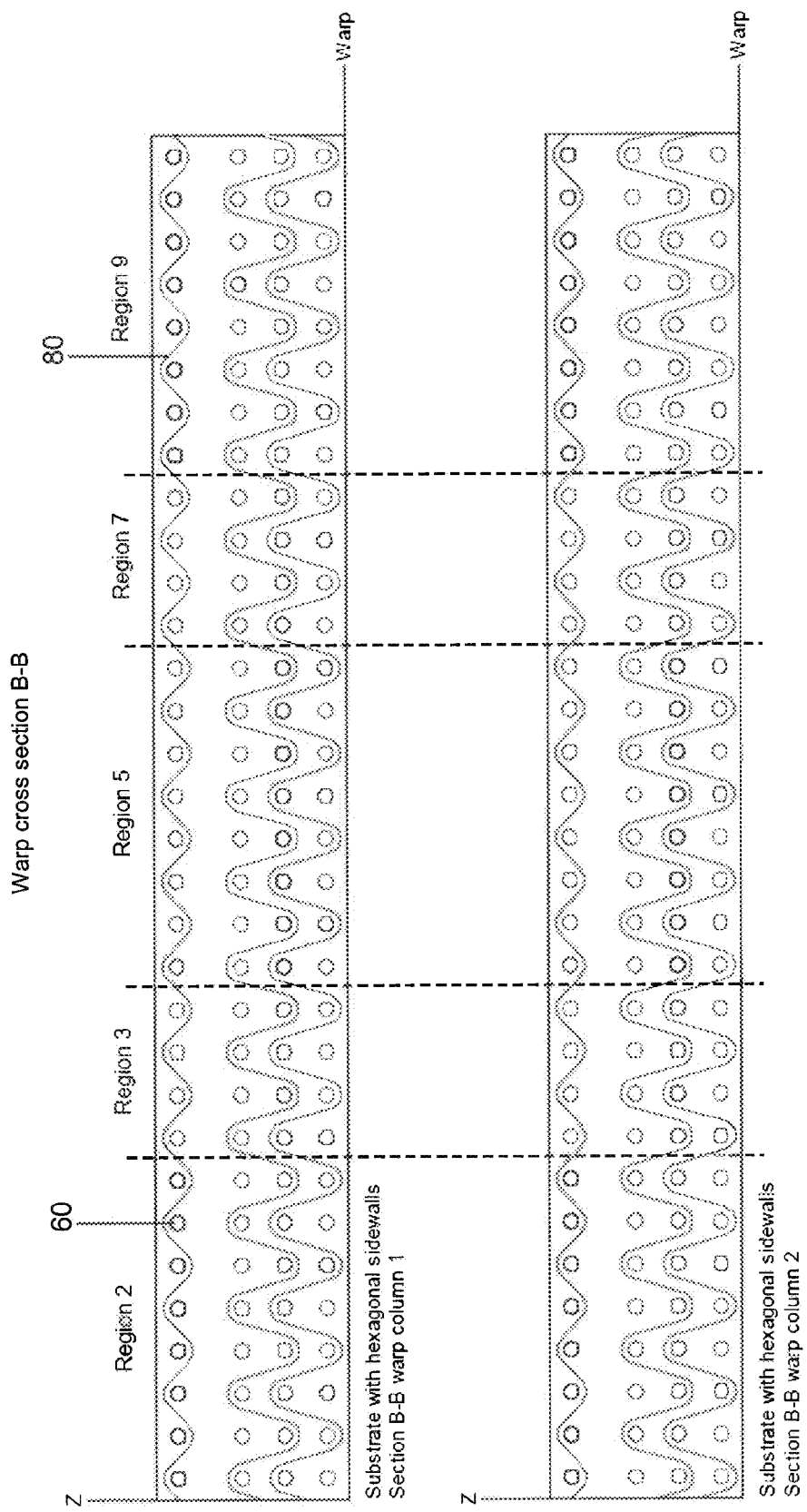
Figure 11:
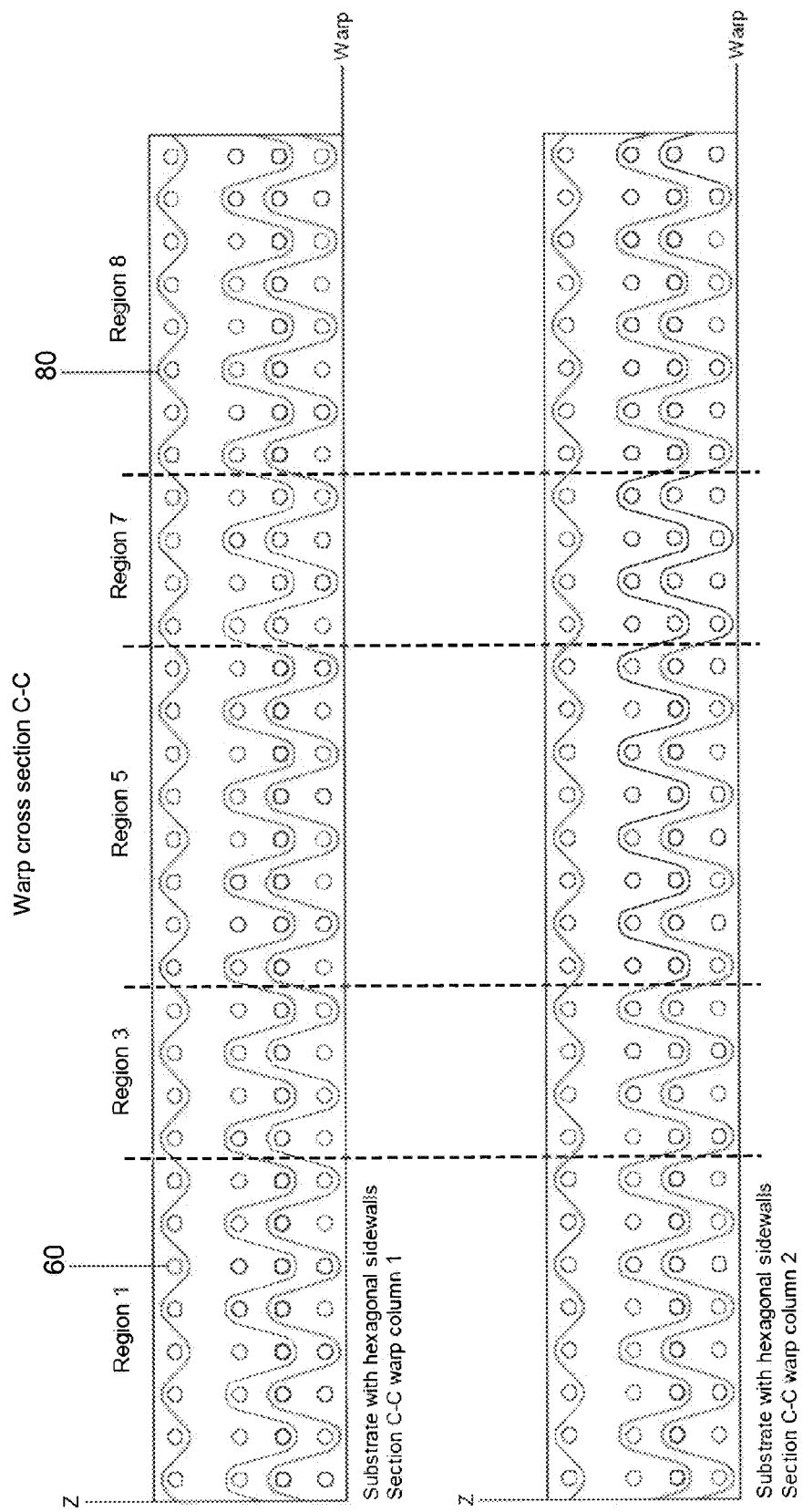
Figure 12:
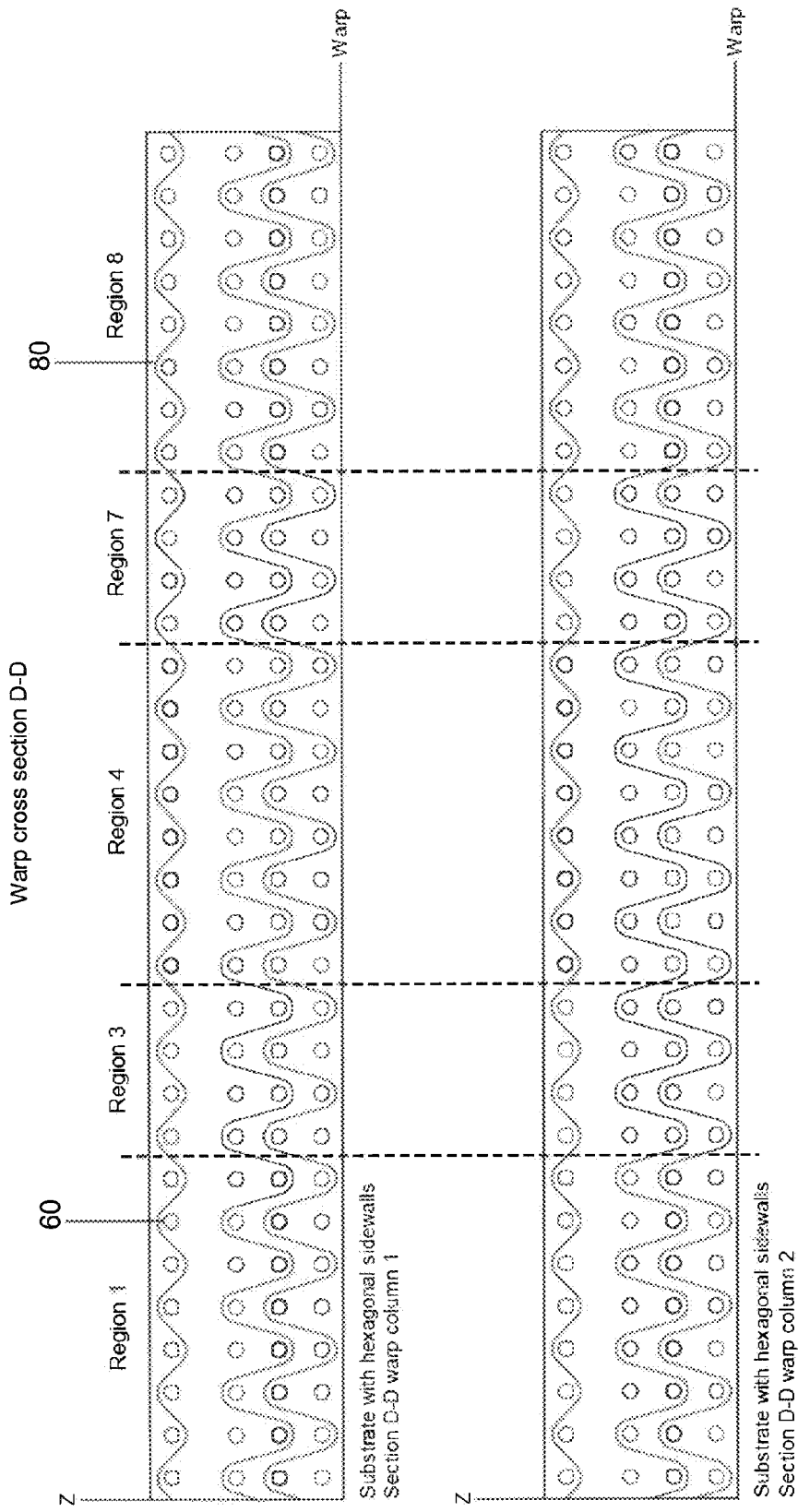

Similar cross sections for cuts B-B, C-C, and D-D are shown in FIGS. 10-12, respectively. The differences between cross sections A-A through D-D are the relative positions of the weft fibers 60 in layers 1 and 3. It is to be noted, however, that weft fibers 60 in layers 1 and 3 do not change layers in regions 3 and 7.

Figure 13:
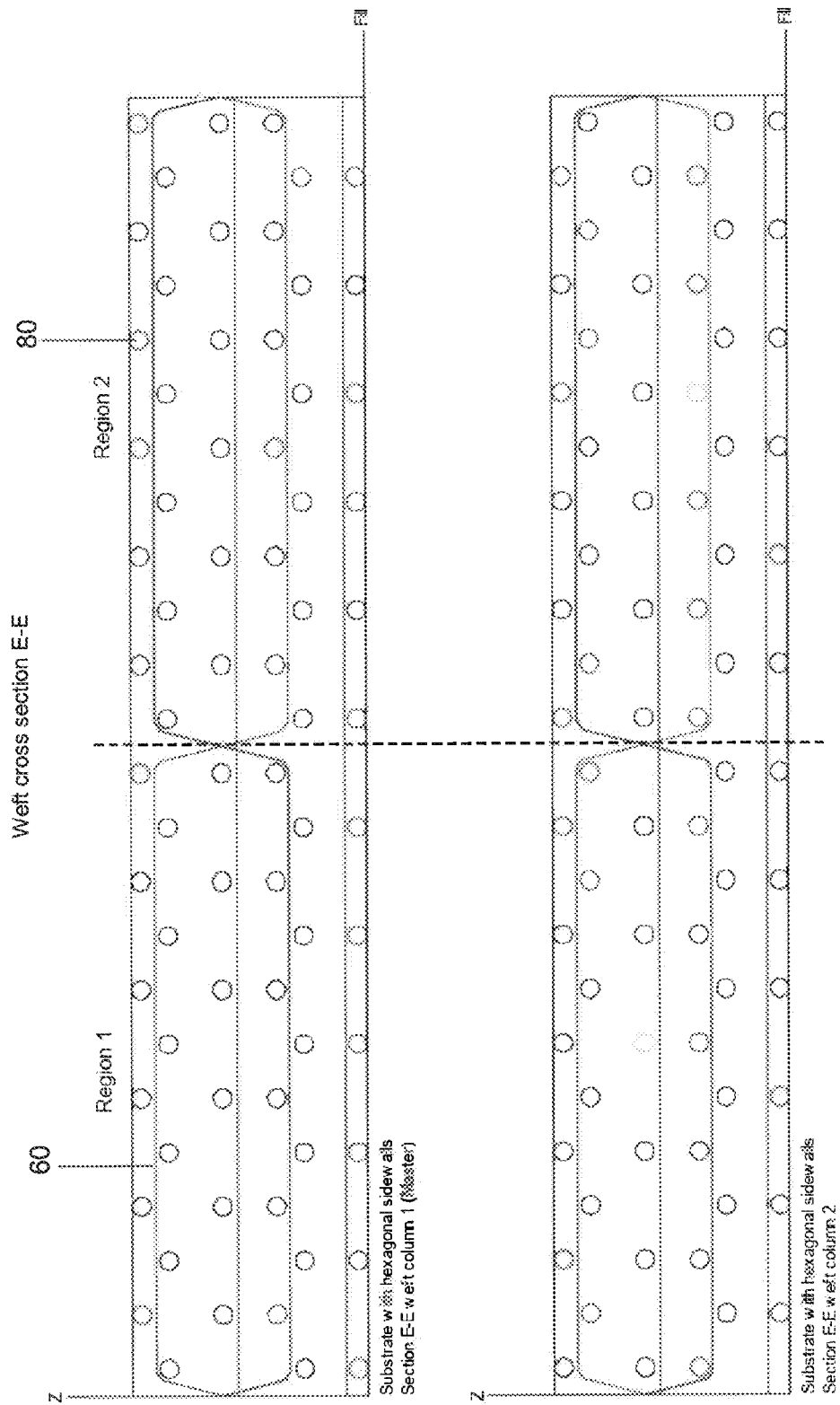
Figure 14:
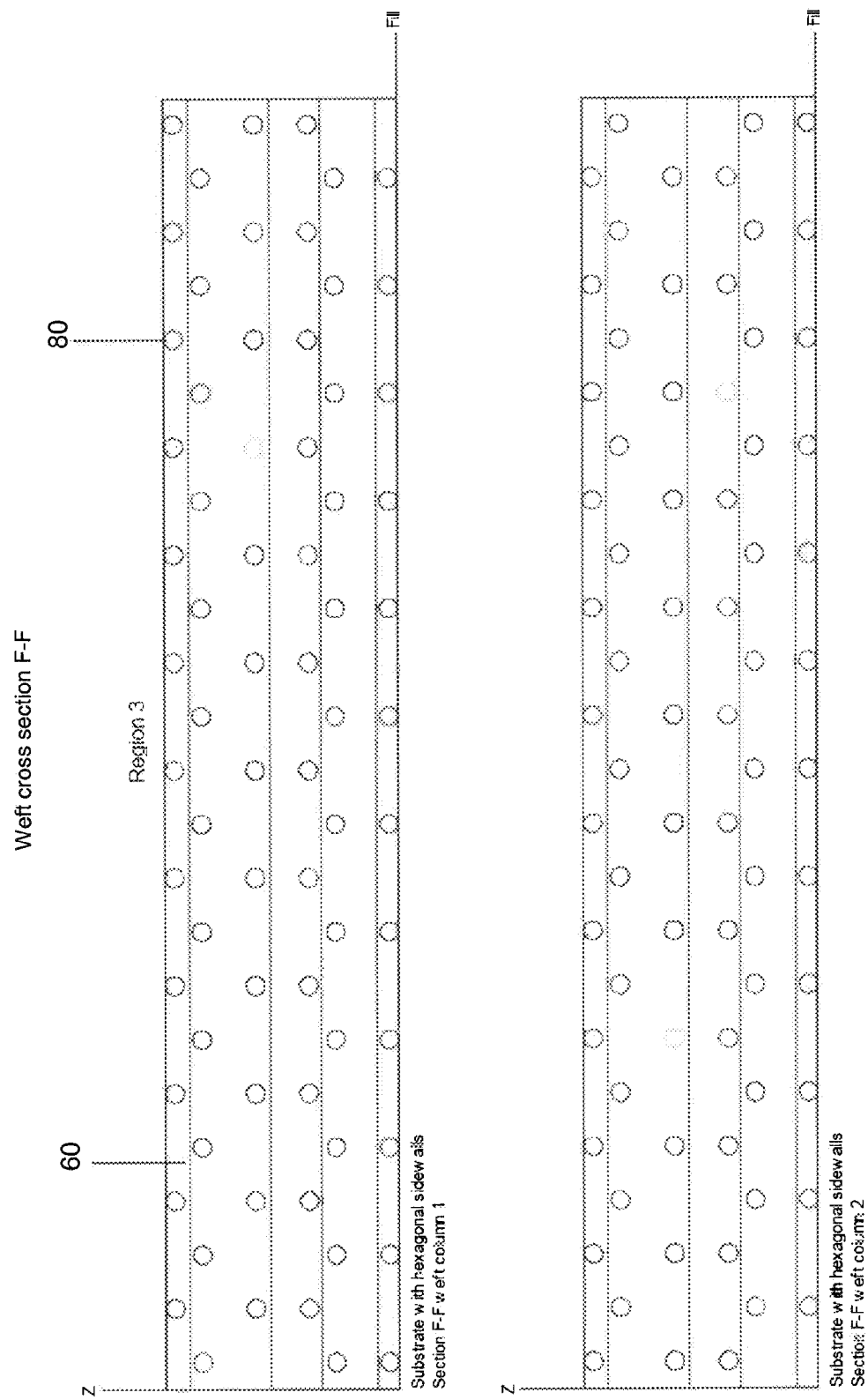
Figure 15:
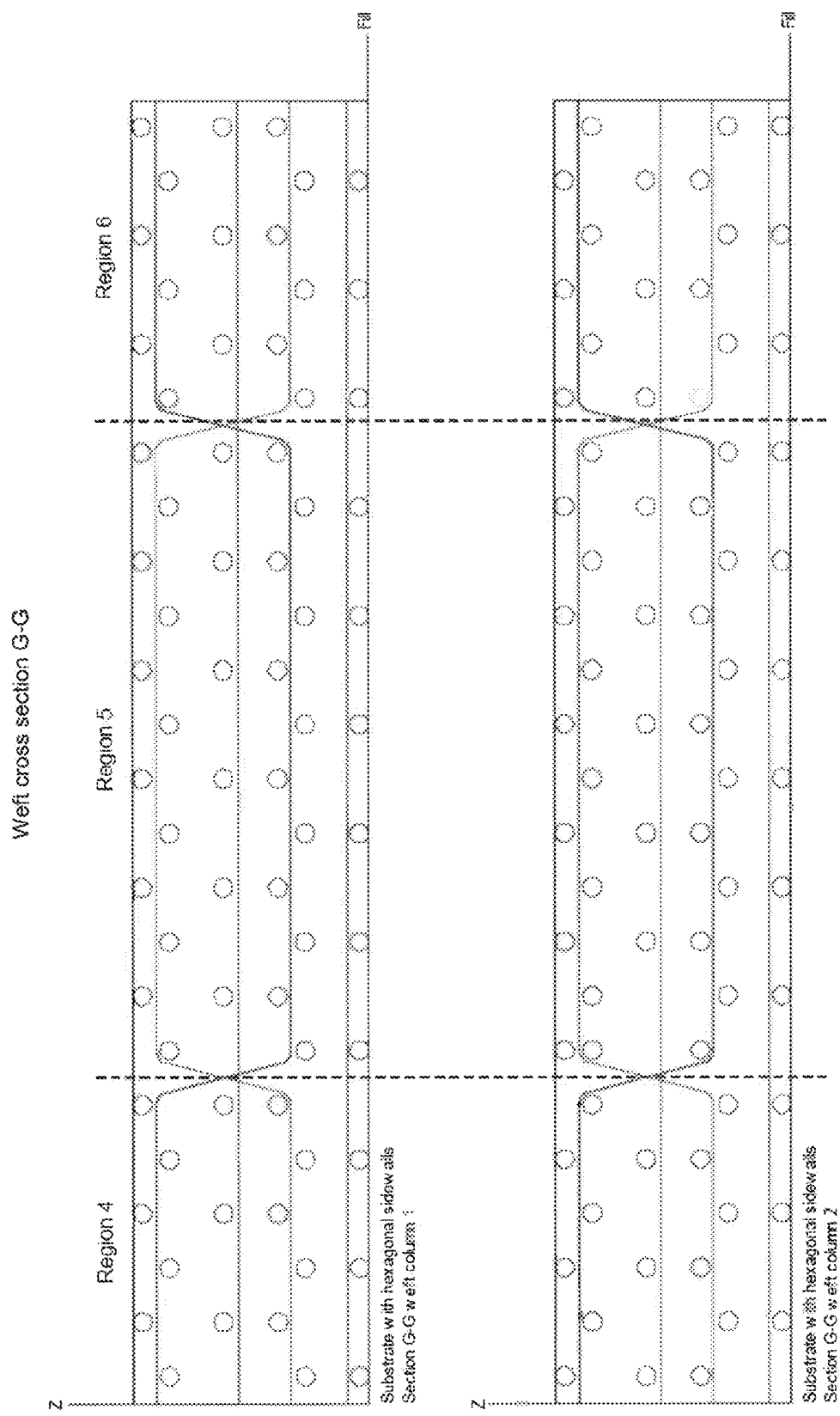

Now, weft cross sections are shown in FIGS. 13-15. The weft fibers 60 in layers 2 and 4 remain in a single layer in all weft cross sections. Referring to weft column 1 for section cut E-E at the top of FIG. 13, the weft fiber 60 in layer 1 in region 1 weaves into layer 3 in region 2. The weft fiber 60 in layer 3 in region 1 weaves into layer 1 in region 2. The weft fibers 60 in layer 1 eventually become the transverse fibers, relative to the longitudinal direction of the stiffeners, in the sidewalls.

As previously mentioned, the weft fibers 60 in region 3 and 7 do not weave between layers. This is shown in FIG. 14 for region 3. FIG. 15 shows how weft fibers 60 in layers 1 and 3 switch positions as they go from region 4 to region 5 to region 6. Cross sections for region 7 and the combined regions 8 and 9 have not been shown, but they are comparable to the cross sections for region 3 and the combined regions 1 and 2, respectively.

Figure 16:
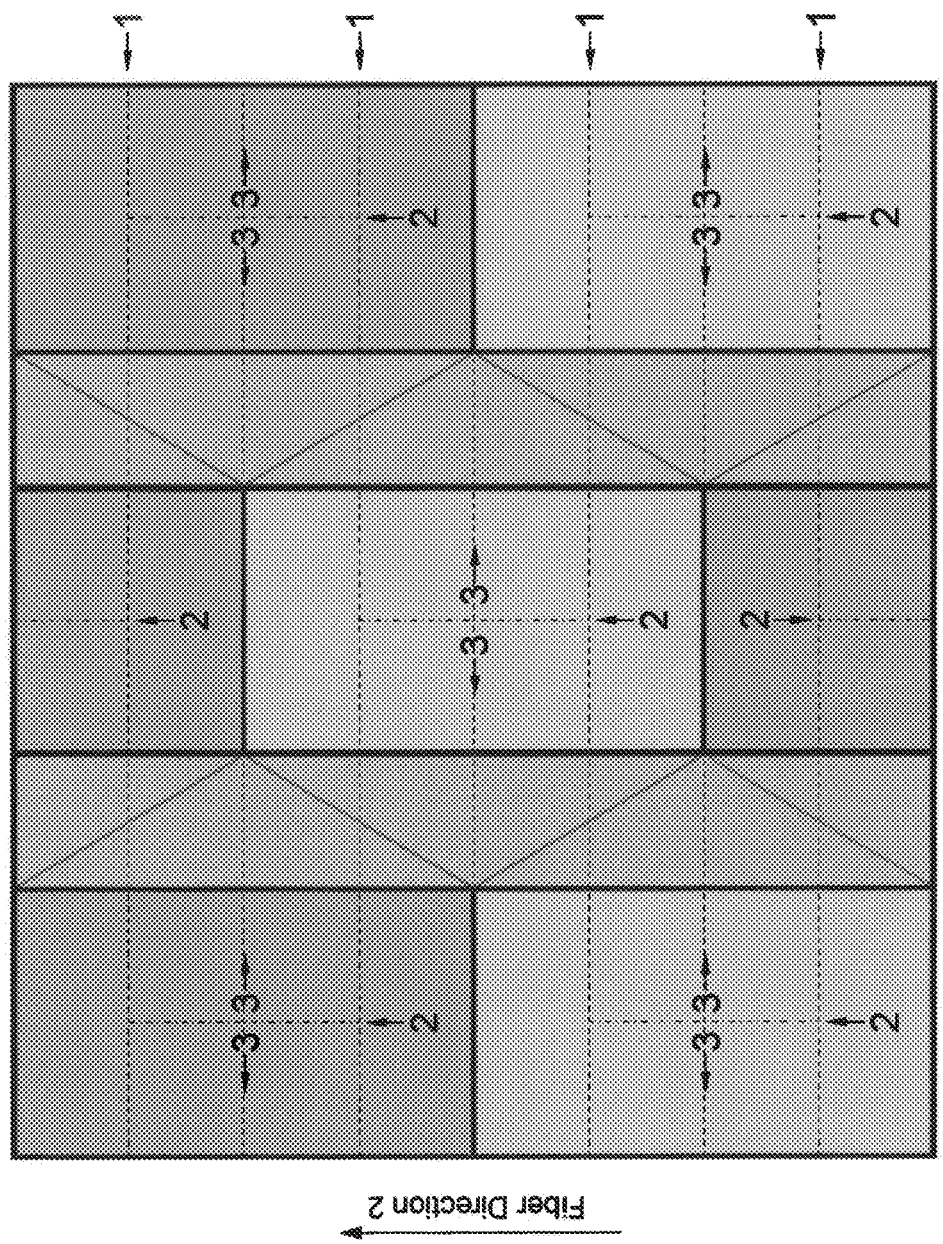
FIGS. 16-18 are schematics of a woven preform, according to one aspect of the invention.

According to one exemplary embodiment of the invention, a series of slits are made in the preform 100 to allow the sidewalls to open. The first step here is to make longitudinal slits (in the warp direction) in layer 1 at the positions shown in FIG. 16 by the arrows marked with the number 1 along the respective dotted line. The second step is a series of transverse slits between the previous longitudinal slits. These slits are shown in FIG. 16 by the arrows marked with the number 2 along the respective dotted line. Finally, another series of longitudinal slits is made at the locations shown in FIG. 16 by the arrows marked with the number 3 along the respective dotted line.

Figure 17:
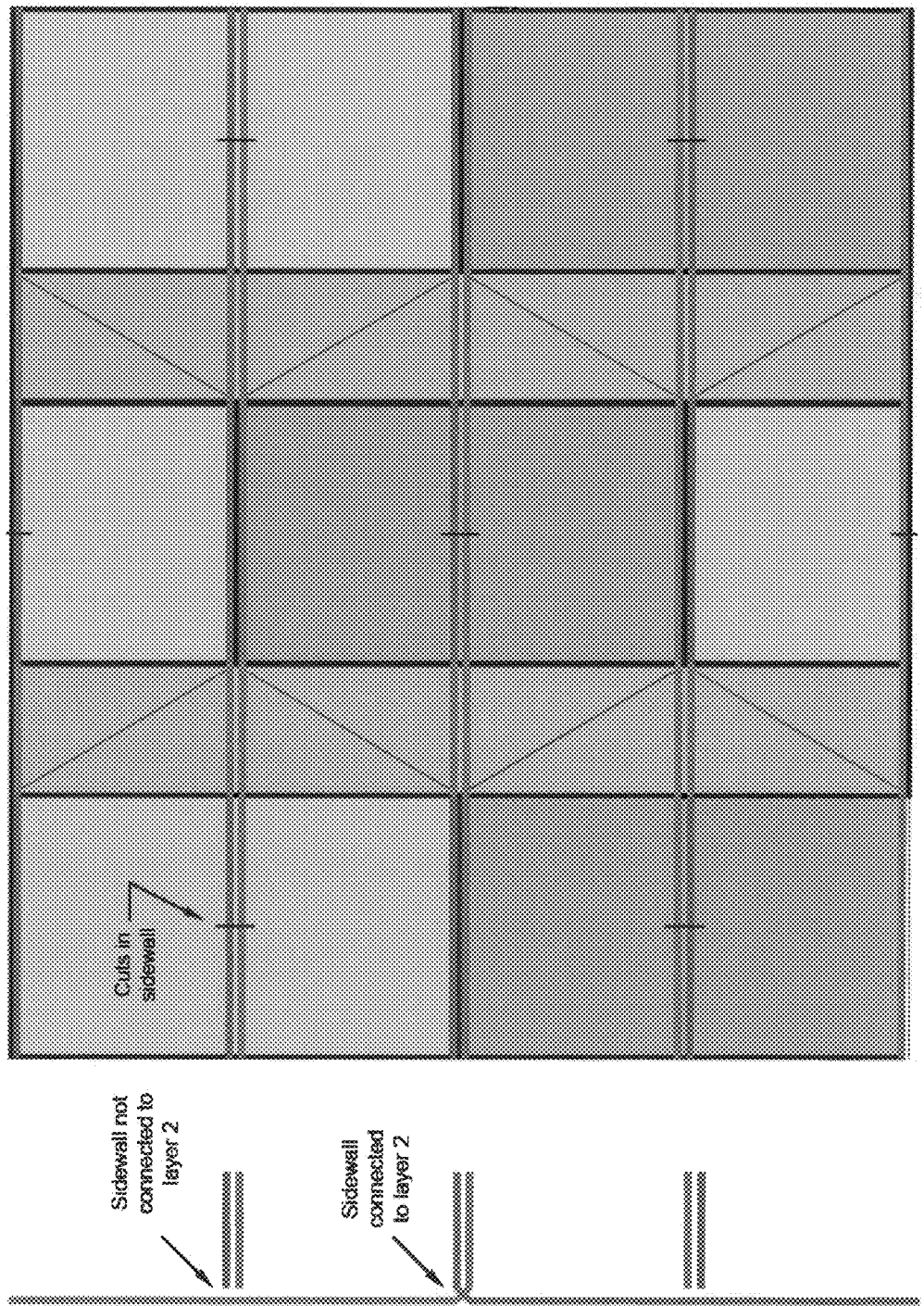
Figure 18:
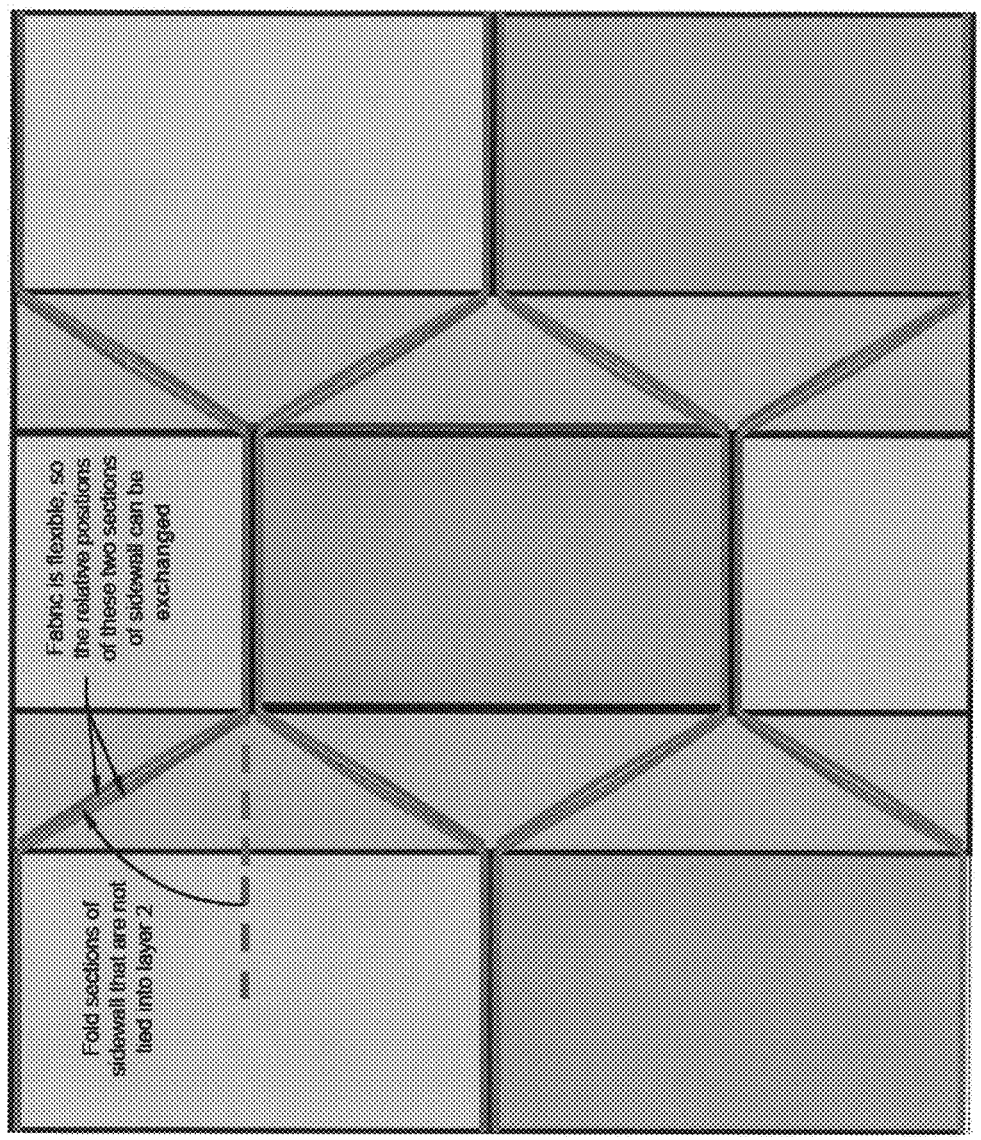

The continuous sidewalls are then formed by folding the two halves of layer 1 so that they are perpendicular to the substrate, as shown in FIG. 17. These sidewalls will, however, only be attached to the substrate at the intersections of regions 1 and 2, 4 and 5, 5 and 6, and 8 and 9. The sections of sidewall that are not attached to the substrate are exactly the right length to form the remaining sidewalls of a hexagon as shown in FIG. 18. Each sidewall will include two layers of fabric, according to one exemplary embodiment of the invention.

Figure 19B:
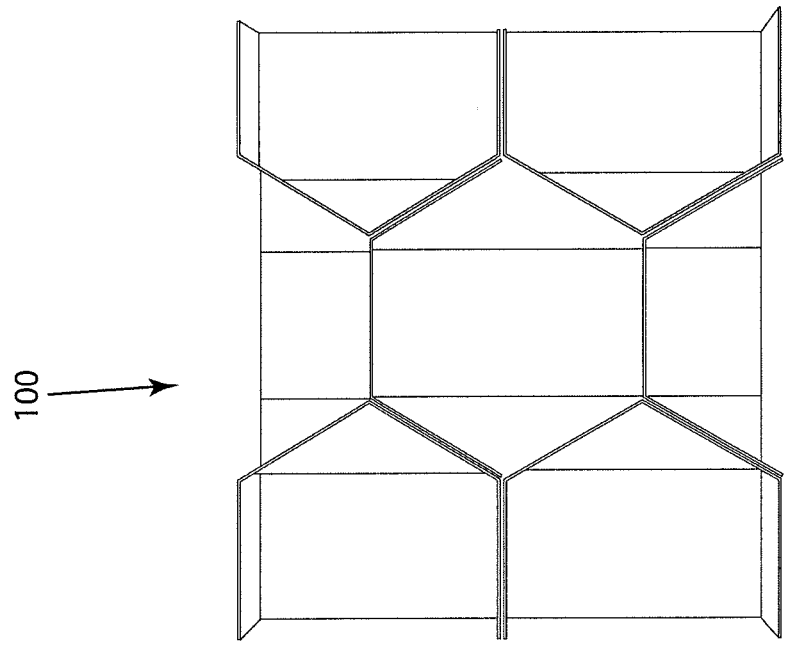
FIGS. 19(a)-(b) are paper mockups of a woven preform, according to one aspect of the invention.
Figure 19A:
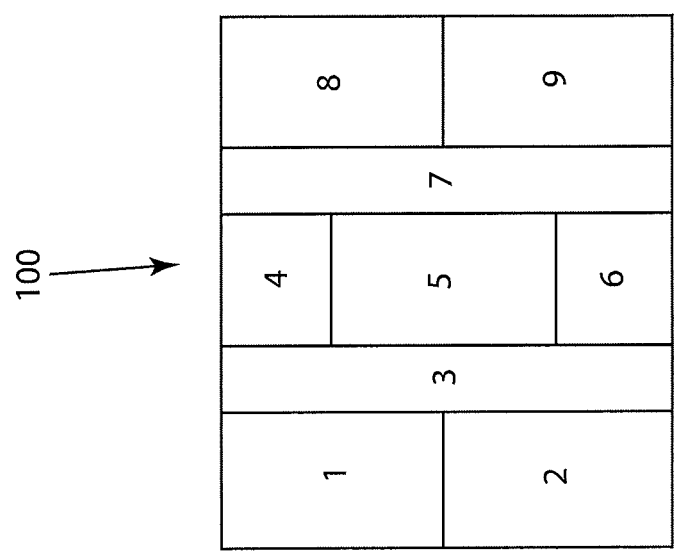

A paper mockup of a preform 100, according to this embodiment, is shown in its as-woven state in FIG. 19(*a*) Regions 1-2, 4-6, and 8-9 represent weft fiber groups that change positions between the two layers, and regions 3 and 7 represent weft fiber groups that only weave in the top layer. The same preform 100 after slitting and folding is shown in FIG. 19(*b*) The hexagonal shape of the sidewalls is readily apparent as can be seen in FIG. 19(*b*).

Therefore, in accordance with this embodiment, an integrally woven preform with stiffeners in two or more directions is constructed from a woven base fabric. The fabric structure may include a first woven fabric layer, a second woven fabric layer, and a number of yarns interwoven between the first woven fabric layer and the second woven fabric layer in a number of independent regions. The first fabric is slit and folded relative to the second fabric such that a first stiffener is formed in a first direction in the preform, and a portion of the first stiffener is folded to form a second stiffener in a second direction in the preform, the second stiffener being an off-axis stiffener. The woven preform may also include a third woven fabric layer, and some of yarns may be interwoven between the second woven fabric layer and the third woven fabric layer in a number of independent regions. The third fabric is slit and folded relative to the second fabric such that a third stiffener is formed in a third direction in the preform, and a portion of the third stiffener is folded to form a fourth stiffener in a fourth direction in the preform, the fourth stiffener being an off-axis stiffener.

It should be noted that the preform may be woven in any chosen pattern. For example, the warp fiber pattern may be selected from ply-to-ply, orthogonal, and angle interlock styles. The interwoven yarns may be warp and/or weft yarns. These yarns may be made of any material, for example, carbon, nylon, rayon, fiberglass, cotton, ceramic, aramid, and polyethylene.

The invention according to one embodiment is a fiber reinforced composite including the integrally woven preform described in the above embodiment. The preform, for example, can be impregnated with a matrix material, such as for example, a resin. The composite may be processed via resin transfer molding or chemical vapor filtration. The resin material can be any of epoxy, polyester, bismaleimide, vinylester, ceramic, and carbon.

Figure 20A:
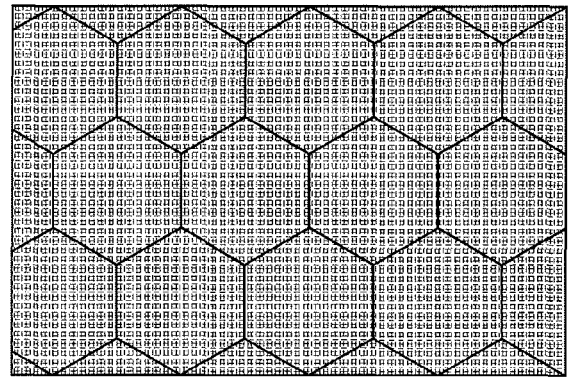
FIGS. 20(a)-(c) are photographs of a woven preform, according to one aspect of the invention.
Figure 20B:
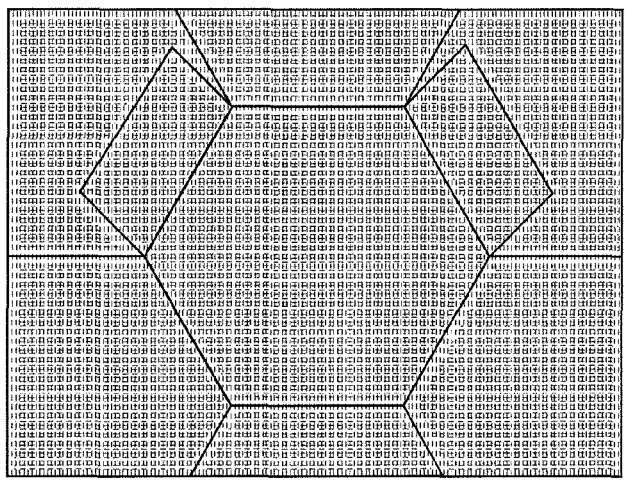
Figure 20C:
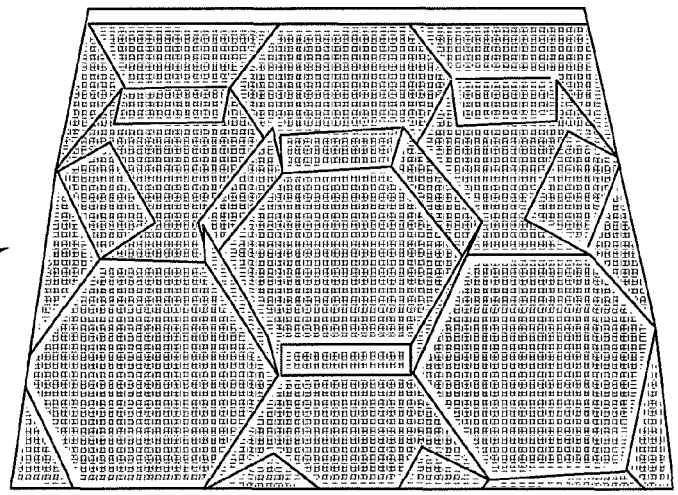

The invention according to one exemplary embodiment is a method of forming an integrally woven preform 200, similar to the first except that fibers in both directions exchange positions between the stiffeners and the skin. Photographs of a fabric 200 that uses this approach are shown in FIGS. 20(*a*)-(*c*). The fabric 200 in these photos shows a panel that has stiffeners in a hexagonal array. The hexagonal pattern formed by the fibers exchanging locations is readily apparent as can be seen in FIG. 20(*a*).

The hexagon shaped segments of the surface layer of the preform 200 may be slit to form three stiffeners, as shown in FIG. 20(*b*). These stiffeners are folded into place to form a hexagonal array, for example, as shown in FIG. 20(*c*). Only one full hexagon is shown in this photograph, but this repeating element can be duplicated over the entire surface of the panel as may be apparent to one of ordinary skill in the art.

This same method can also be used to form a preform 300 that has stiffeners in the ±45° directions by arranging the exchange locations in a diamond pattern rather than a hexagonal pattern, for example, as shown in FIGS. 21(*a*)-(*d*). It is to be noted that FIGS. 21(*c*) & 21(*d*) are opposite sides, e.g., top side and bottom side, of the same preform 300. In this case the ±45° stiffener on one side may be balanced by a −45° stiffener on the opposite side, for example. This is, however, not a necessary condition and configurations with stiffeners on only one side are within the scope of the instant invention.

Therefore, in accordance with this embodiment, an integrally woven preform with stiffeners in two or more directions may be constructed from a woven fabric. The fabric may include a first woven fabric layer, a second woven fabric layer, and a number of yarns interwoven between the first woven fabric layer and the second woven fabric layer. Some of the yarns are interwoven over a region between the first fabric and the second fabric, and the first fabric is slit and folded relative to the second fabric such that a first off-axis stiffener is formed in the preform. A first portion on a first side of an interwoven region of the first woven fabric layer is folded together with a first portion on a second side of the interwoven region of the first woven fabric layer to form an off-axis stiffener rib in a first direction. The woven preform may also include a third woven fabric layer, and a number of yarns interwoven between the second woven fabric layer and the third woven fabric layer. Some of the yarns are interwoven over a region between the second fabric and the third fabric, and the third fabric is slit and folded relative to the second fabric such that a second off-axis stiffener is formed in the preform. A first portion on a first side of an interwoven region of the third woven fabric layer is folded together with a first portion on a second side of the interwoven region of the third woven fabric layer to form an off-axis stiffener rib in a second direction.

As described in the previous embodiments, the preform may be woven in any chosen pattern. For example, the warp fiber pattern may be selected from ply-to-ply, orthogonal, and angle interlock styles. The interwoven yarns may be warp and/or weft yarns. These yarns may be made of any material, for example, carbon, nylon, rayon, fiberglass, cotton, ceramic, aramid, and polyethylene.

The invention according to one embodiment is a fiber reinforced composite including the integrally woven preform described in the above embodiment. The preform, for example, can be impregnated with a matrix material, such as for example, a resin to form a composite. The composite may be processed via resin transfer molding or chemical vapor filtration. The resin material can be any of epoxy, polyester, bismaleimide, vinyl-ester, ceramic, and carbon.

Figure 22B:
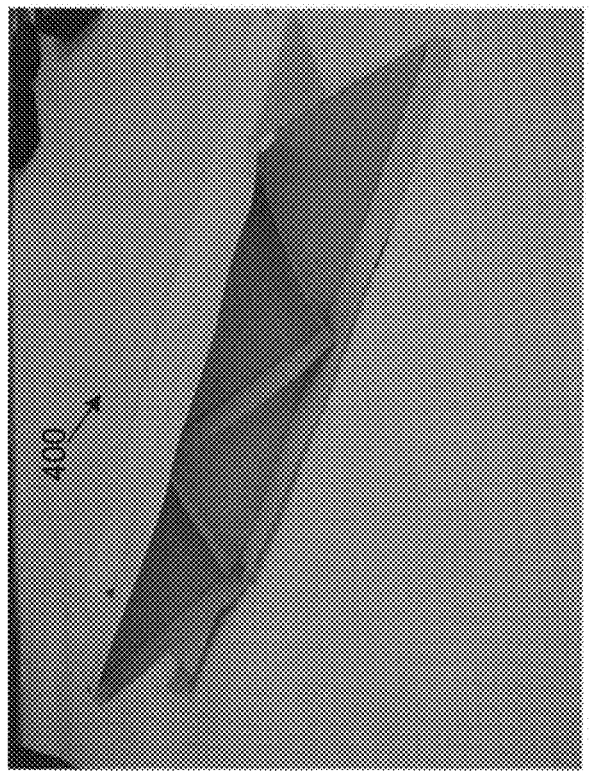
FIGS. 22(a)-(b) are paper mockups of a woven preform, according to one aspect of the invention.
Figure 22A:
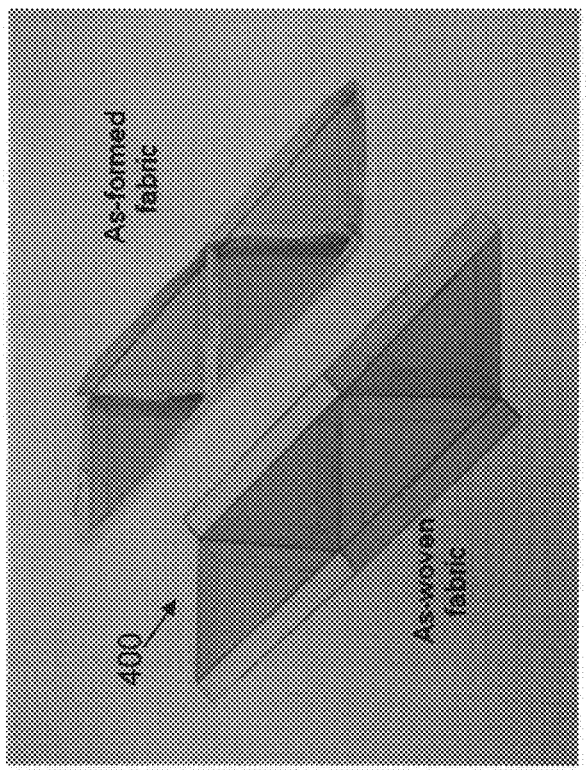

As previously mentioned, the methods of the instant invention can also be incorporated into the web of 3D woven beams that have integral flanges and webs, for example, I-beam or channels. In these cases, exchange locations are arranged to form triangles that will place stiffeners between the flanges. Although the stiffeners can be oriented at practically any angle, relative to the flanges, orienting them at ±45° maximizes their contribution to the shear strength and stiffness of the beam. Another useful orientation possible with this technique is when the stiffeners are perpendicular to the flanges, forming intercostals that support the beam in through thickness compression. Paper mock ups of typical configurations for an I-beam and for a channel are shown in FIGS. 22(a) and 22(b), respectively.

The invention according to one exemplary embodiment is a method of forming an integrally woven preform 500, as shown in FIG. 23. In this embodiment, warp and weft fibers weaving at the surface in region 1 can exchange places with complimentary warp and weft fibers that have been weaving into the skin at the interface between regions 1 and 2, for example. These same fibers can exchange places again at the intersection of regions 2 and 3. The top sheet of fabric 500 can be slit in the weft direction to produce the material that gets folded up to form the stiffeners in accordance with this embodiment.

Although preferred embodiments of the present invention and modifications thereof have been described in detail herein, it is to be understood that this invention is not limited to this precise embodiment and modifications, and that other modifications and variations may be effected by one skilled in the art without departing from the spirit and scope of the invention as defined by the appended claims.

What is claimed is:

1. An integrally woven preform with stiffeners in two or more directions constructed from a woven base fabric, said base fabric comprising:
    a first woven fabric;
    a second woven fabric;
    a third woven fabric;
    a plurality of yarns interwoven between said first woven fabric and said second woven fabric, wherein said plurality of yarns are interwoven over a region between said first fabric and said second fabric, and said first fabric is folded relative to said second fabric such that a first integral stiffener is formed in said preform;
    a plurality of yarns interwoven between said second woven fabric and said third woven fabric, wherein said plurality of yarns are interwoven over a region between said second fabric and said third fabric, and said third fabric is folded relative to said second fabric such that a second integral stiffener is formed in said preform; and
    wherein said first integral stiffener and/or said second integral stiffener is an integral off-axis stiffener that is oriented in a direction or angle other than 0 and +/−90 degrees from a direction aligned with warp or weft yarns or fibers, and perpendicular to the second fabric.

2. The woven preform of claim 1, wherein said first woven fabric is slit from a top surface of said second woven fabric in one or more regions.

3. The woven preform of claim 2, wherein a first portion on a first side of an interwoven region of said first woven fabric is folded together with a first portion on a second side of the interwoven region of said first woven fabric to form an off-axis stiffener rib in a first direction.

4. The woven preform of claim 1, wherein said third woven fabric is slit from a bottom surface of said second woven fabric in one or more regions.

5. The woven preform of claim 4, wherein a first portion on a first side of an interwoven region of said third woven fabric is folded together with a first portion on a second side of the interwoven region of said third woven fabric to form an off-axis stiffener rib in a second direction.

6. The woven preform of claim 1, wherein said base fabric is woven from warp and weft yarns or fibers.

7. The woven preform of claim 6, wherein the warp fiber pattern is a pattern selected from the group consisting of ply-to-ply, orthogonal, and angle interlock.

8. The woven preform of claim 6, wherein the interwoven yarns are warp yarns.

9. The woven preform of claim 6, wherein the interwoven yarns are weft yarns.

10. The woven preform of claim 6, wherein said warp and weft yarns or fibers are selected from the group of consisting of carbon, nylon, rayon, fiberglass, cotton, ceramic, aramid, and polyethylene.

11. The woven preform of claim 1, wherein said integral off-axis stiffener is formed at +/−60 degrees or +/−45 degrees orientation.

12. A fiber reinforced composite comprising an integrally woven preform with stiffeners in two or more directions constructed from a woven base fabric, said base fabric comprising:
    a first woven fabric;
    a second woven fabric;
    a third woven fabric;
    a plurality of yarns interwoven between said first woven fabric and said second woven fabric, wherein said plurality of yarns are interwoven over a region between said first fabric and said second fabric, and said first fabric is folded relative to said second fabric such that a first integral stiffener is formed in said preform;

a plurality of yarns interwoven between said second woven fabric and said third woven fabric, wherein said plurality of yarns are interwoven over a region between said second fabric and said third fabric, and said third fabric is folded relative to said second fabric such that a second integral stiffener is formed in said preform; and wherein said first integral stiffener and/or said second integral stiffener is an integral off-axis stiffener that is oriented in a direction or angle other than 0 and +/−90 degrees from a direction aligned with warp or weft yarns or fibers, and perpendicular to the second fabric.

13. The composite of claim 12, further comprising a matrix material.

14. The composite of claim 13, wherein said matrix material is a resin, and said composite is formed from a process selected from the group consisting of resin transfer molding and chemical vapor filtration.

15. The composite of claim 13, wherein said matrix material is selected from the group consisting of epoxy, polyester, bismaleimide, vinyl-ester, ceramic, and carbon.

16. The composite of claim 12, wherein said integral off-axis stiffener is formed at +/−60 degrees or +/−45 degrees orientation.

17. An integrally woven preform with stiffeners in two or more directions constructed from a woven base fabric, said base fabric comprising:
    a first woven fabric;
    a second woven fabric; and
    a plurality of yarns interwoven between said first woven fabric and said second woven fabric in a plurality of independent regions,
    wherein said first fabric is folded relative to said second fabric such that a first stiffener is formed in a first direction in said preform, and a portion of said first stiffener is folded to form a second stiffener in a second direction in said preform, said first stiffener and/or said second stiffener being an integral off-axis stiffener that is oriented in a direction or angle other than 0 and +/−90 degrees from a direction aligned with warp or weft yarns or fibers, and perpendicular to the second fabric;
    a third woven fabric; and
    a plurality of yarns interwoven between said second woven fabric and said third woven fabric in a plurality of independent regions,
    wherein said third fabric is folded relative to said second fabric such that a third stiffener is formed in a third direction in said preform, and a portion of said third stiffener is folded to form a fourth stiffener in a fourth direction in said preform, said fourth stiffener being an off-axis stiffener.

18. The woven preform of claim 17, wherein said first woven fabric is slit from a top surface of said second woven fabric in one or more regions.

19. The woven preform of claim 17, wherein said third woven fabric is slit from a bottom surface of said second woven fabric in one or more regions.

20. The woven preform of claim 17, wherein said base fabric is woven from warp and weft yarns or fibers.

21. The woven preform of claim 20, wherein the warp fiber pattern is a pattern selected from the group consisting of ply-to-ply, orthogonal, and angle interlock.

22. The woven preform of claim 20, wherein the interwoven yarns are warp yarns.

23. The woven preform of claim 20, wherein the interwoven yarns are weft yarns.

24. The woven preform of claim 20, wherein said warp and weft yarns or fibers are selected from the group of consisting of carbon, nylon, rayon, fiberglass, cotton, ceramic, aramid, and polyethylene.

25. The woven preform of claim 17, wherein said second stiffener and fourth stiffener are formed at +/−60 degrees or +/−45 degrees orientation.

26. A fiber reinforced composite comprising an integrally woven preform with stiffeners in two or more directions constructed from a woven base fabric, said base fabric comprising:
    a first woven fabric;
    a second woven fabric; and
    a plurality of yarns interwoven between said first woven fabric and said second woven fabric in a plurality of independent regions,
    wherein said first fabric is folded relative to said second fabric such that a first stiffener is formed in a first direction in said preform, and a portion of said first stiffener is folded to form a second stiffener in a second direction in said preform, said first stiffener and/or said second stiffener being an integral off-axis stiffener that is oriented in a direction or angle other than 0 and +/−90 degrees from a direction aligned with warp or weft yarns or fibers, and perpendicular to the second fabric;
    a third woven fabric; and
    a plurality of yarns interwoven between said second woven fabric and said third woven fabric in a plurality of independent regions,
    wherein said third fabric is folded relative to said second fabric such that a third stiffener is formed in a third direction in said preform, and a portion of said third stiffener is folded to form a fourth stiffener in a fourth direction in said preform, said fourth stiffener being an off-axis stiffener.

27. The composite of claim 26, further comprising a matrix material.

28. The composite of claim 27, wherein said matrix material is a resin, and said composite is formed from a process selected from the group consisting of resin transfer molding and chemical vapor filtration.

29. The composite of claim 27, wherein said matrix material is selected from the group consisting of epoxy, polyester, bismaleimide, vinyl-ester, ceramic, and carbon.

30. The composite of claim 26, wherein said second stiffener is formed at +/−60 degrees or +/−45 degrees orientation.

31. The woven preform of claim 1, wherein the woven preform is an I-beam.

32. The fiber reinforced composite of claim 12, wherein the fiber reinforced composite is an I-beam.

33. The woven preform of claim 17, wherein the woven preform is an I-beam.

34. The fiber reinforced composite of claim 26, wherein the fiber reinforced composite is an I-beam.

* * * * *